United States Patent
Eglit

(10) Patent No.: US 6,272,193 B1
(45) Date of Patent: Aug. 7, 2001

(54) RECEIVER TO RECOVER DATA ENCODED IN A SERIAL COMMUNICATION CHANNEL

(75) Inventor: Alexander Julian Eglit, Half Moon Bay, CA (US)

(73) Assignee: Genesis Microchip Corp., Alviso, CA (US)

(*) Notice: Subject to any disclaimer, the term of this patent is extended or adjusted under 35 U.S.C. 154(b) by 0 days.

(21) Appl. No.: 09/406,332

(22) Filed: Sep. 27, 1999

(51) Int. Cl.[7] .................................................. H04L 7/00
(52) U.S. Cl. ............................ 375/355; 375/316; 370/503
(58) Field of Search ................................. 375/355, 324, 375/354, 316; 370/503; 329/304

(56) References Cited

U.S. PATENT DOCUMENTS 5,313,496 * 5/1994 DeGoede ........................... 375/342
5,892,803 * 4/1999 Saunders et al. ................... 375/355

* cited by examiner

*Primary Examiner*—Temesghen Ghebretinsae
(74) *Attorney, Agent, or Firm*—Law Firm of Naren Thappeta

(57) ABSTRACT

A receiver to recover data encoded at high speed in a signal over a serial communication channel. A static phase determination circuit indicates whether the signal is early, late or neutral relative to a sampling clock. The sampling clock is used to oversample the signal to generate multiple samples. A token analyzer examines the transitions around a current symbol to determine any short term phase shifts of the boundaries between symbols. The short term phase shifts and the static phase together may be used to accurately select the samples representing the symbols without requiring extensive processing.

33 Claims, 11 Drawing Sheets

RECEIVER TO RECOVER DATA ENCODED IN A SERIAL COMMUNICATION CHANNEL

BACKGROUND OF THE INVENTION

1. Field of the Invention

The present invention relates to data communications, and more specifically to a receiver which can efficiently recover the data encoded in a high speed serial communication channel. The invention has particular application in digital display units such as flat-panel monitors.

2. Related Art

Receivers are often used to recover data received on a serial communication channel. In a typical scenario, an encoder encodes information (data) in the form of a sequence of symbols and a modulator generates a signal encoding the sequence of symbols in a serial communication channel. The receiver receives the signal and recovers the encoded symbols. Once the symbols are recovered, the information represented by the symbols may then be easily generated.

To recover the symbols encoded in a received signal, receivers often oversample the received signal to generate multiple samples per each symbol. Oversampling generally refers to sampling a signal more number of times than the number of symbols encoded in the signal. Typical receivers include a phase picker to select from among the samples, with the selected samples representing the symbols encoded in the received signal. Assuming for illustration that an input signal is oversampled by a factor of L (L being a positive integer), phase pickers are generally designed to select one out of L samples.

A prior receiver may determine an optimal sampling phase for a group of successive symbols, and select samples according to the optimal sampling phase. For example, an average sampling phase may be determined and be used as the optimal sampling phase. Such an approach is generally simple to implement, and may therefore be suitable in many situations.

However, such approaches may not be suitable in some environments. For example, due to conditions such as noise and channel mis-equalization, the symbol boundaries may get shifted. If the selection of samples is based solely on an optimal sampling phase (for a group of successive symbols), the selected samples may not accurately represent the encoded symbols due to the shifts.

The probability of such inaccuracies generally increases as the ratio of frequency of encoding to the bandwidth of the transmission medium is higher. Thus, in many media having limited bandwidth, when the symbols are encoded at high frequency, short shifts in the boundaries may lead to a symbol being skipped or more than one sample of a symbol being selected. In other words, if the boundaries shift to make the corresponding symbol period (the duration in which a symbol is encoded) short, the samples from a corresponding symbol may be skipped altogether. On the other hand if the symbol period is long, more than one sample may be selected for a corresponding symbol. Both the cases may be unacceptable at least in some situations.

One prior approach may increase the oversampling factor and examine the samples to determine the optimal samples representing the encoded data. However, receivers based on such high oversampling factor may require additional electrical power and also may result in increased overall cost to design and manufacture. At least in markets targeted for consumer markets, the increased costs and power requirements may not be acceptable.

Therefore, what is needed is a method and apparatus which enables a receiver to accurately recover data encoded in a serial communication channel at least while minimizing the cost and power requirements.

SUMMARY OF THE INVENTION

The present invention enables a receiver to accurately recover the information encoded in a symbol stream received over a serial communication channel. The present invention is particularly useful in environments in which the samples are encoded at high baud rate. A receiver in accordance with the present invention may include an ADC (or multiple ADCs viewed logically as a single ADC) to oversample a received signal according to sampling clock signal to generate multiple samples.

A transition detector may generate transition indicators, with each transition indicator indicating the presence of a change in values of two successive samples. A static phase determination circuit may determine a static phase representing a long term phase shift of the signal relative to a sampling clock signal, wherein the long term phase shift of the signal is determined based on many prior samples corresponding to prior symbols.

A tokens analyzer may examine the transition indicators corresponding to a few symbols including a current symbol to determine any short term phase shift of boundaries between symbols around the present symbol on a per symbol basis. The token analyzer may determine which sample represents the current symbol according to the long term phase shift and the short term phase shift. A samples selector may select the sample determined by the token analyzer as representing the current symbol.

By considering the short term phase shifts, the present invention enables the samples to be selected accurately even in the presence of symbol period changes for individual symbols. Potentially, the samples selection may be made on a per symbol basis.

The receiver may further contain a token assembler for dividing the transition indicators into multiple tokens, with each token containing a number of transition indicators equal to a oversampling factor. Each token is associated with with a symbol and the token corresponding to the current symbol is determined by the sampling clock signal.

The tokens analyzer and the static phase determination circuit are designed to examine the tokens corresponding to the few symbols to determine any phase shift in boundaries relative to the sampling clock signal, and use the determination as to shift in boundaries in computing the static phase. The static phase determination circuit may indicate whether the signal is early, late or neutral relative to the determination of the sampling clock signal.

The static phase determination circuit is designed to generate "hard identifiers" if the examination of tokens corresponding to the few symbols indicates that the signal is early, late or neutral relative to the sampling clock signal, and to generate "soft identifiers" if the examination of tokens corresponding to the few symbols indicates that the signal is not early, not late or not neutral. As the hard identifiers generally provide more deterministic information on the relative phase shift, the hard identifiers are given more weight than the soft identifiers in determining the static phase. In one embodiment, the soft identifiers may be ignored.

A receiver in accordance with the present invention may be used in a digital display unit, which the symbols are encoded with an alphabet containing two elements (0 and 1).

The transition detector may contains multiple XOR gates to generate an XOR of two successive samples. The signal may be oversampled by a factor of 3, and the present invention allows the samples to be selected accurately even if only a single sample is generated for a symbol due to, for example, jitter in the sampling clock or noise otherwise. In general, the present invention allows accurate recovery of a symbol even if the sampling clock is shifted 0 to L−1 samples.

In addition, the tokens analyzer may be implemented to determine the specific sample to select for a symbol by examining a single token (corresponding to the current symbol) and the static phase. Due to the minimal processing required, the present invention is particularly suited for environments in which the symbols are encoded at high baud rates.

Therefore, the present invention provides a receiver which can accurately recover the symbols received in a serial communication channel as the specific sample to be selected may be determined potentially on a per-symbol basis.

The present invention is particularly suitable for environments encoding symbols at high baud rates as the specific samples to be selected can be determined without requiring extensive processing.

The present invention allows for speedy recovery of the symbols as the static phase status may be computed in parallel to the selection of samples on a per-symbol basis.

The present invention allows for speedy recovery of the symbols as the computation of the status phase may enable the samples to be selected with minimal lookup and/or processing, for example, in the case of oversampling of 3, only the comparison points related to the present symbol may need to be examined.

The present invention is particularly useful in display units which receive signals encoded with pixel data elements at high frequencies as the encoded data can be recovered accurately in accordance with the present invention.

The present invention allows for accurate recovery of the symbols encoded in a serial communication channel as the boundary information around a current symbol is considered in determining the specific sample to be selected.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

A phase picker in accordance with the present invention may select samples potentially on a per-symbol basis while minimizing the overall cost and electrical power requirements. To accomplish such selection, the phase picker may determine a static phase shift representing an average shift of symbols based on several prior samples, and then determine the specific sample to be selected for each symbol by examining the samples representing the symbol.

As the samples are selected on a per symbol basis, a receiver may accurately recover the data received in a serial communication channel. The static phase status may account for the long term phase shifts in the symbol boundaries while the short term phase shifts may be accounted for by the examination of the samples potentially representing the symbol.

The present invention is described below in further detail with reference to several examples for illustration. A typical configuration in which the present invention may be implemented is described first.

2. Example Configuration

Figure 1:
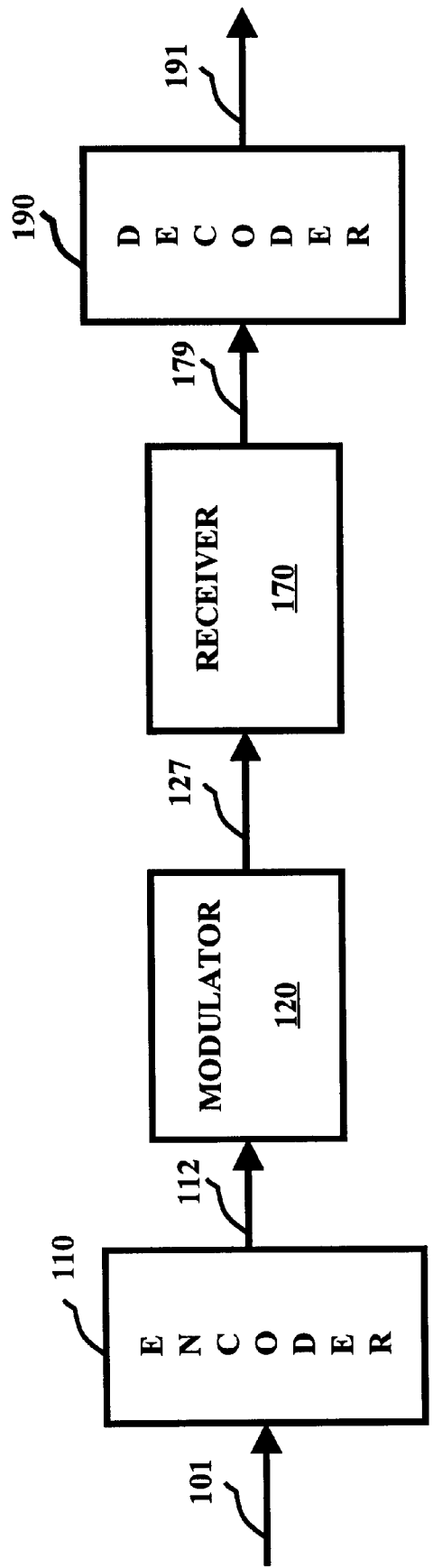
FIG. 1 is a block diagram illustrating a typical environment in which a receiver may be implemented in accordance with the present invention.

FIG. 1 is a block diagram illustrating a typical configuration in which the present invention can be implemented. Encoder 110 receives data on path 101 and encodes the data into symbols. Each symbol typically contains a pre-specified number of bits. Encoder 110 sends the symbols to modulator 120 on link 112. Encoder 110 may be implemented in a known way.

Modulator 120 may encode the symbols received on link 112 in a signal, and transmit the signal on serial communication channel 127. Communication channel 127 may contain synchronization signals also. Modulator 120 and encoder may be implemented in a known way.

Receiver 170 receives a signal over serial communication channel 127, and recovers the symbols encoded in the signal in accordance with the present invention. Receiver 170 may send the recovered symbols to decoder 190, which decodes the symbols to generate data on path 191. If the recovery of the symbols is accurate, the data on path 191 equals the data received on path 101. The operation and implementation of receiver 170 which enables such accurate recovery is described below in further detail.

3. Receiver

Figure 2:
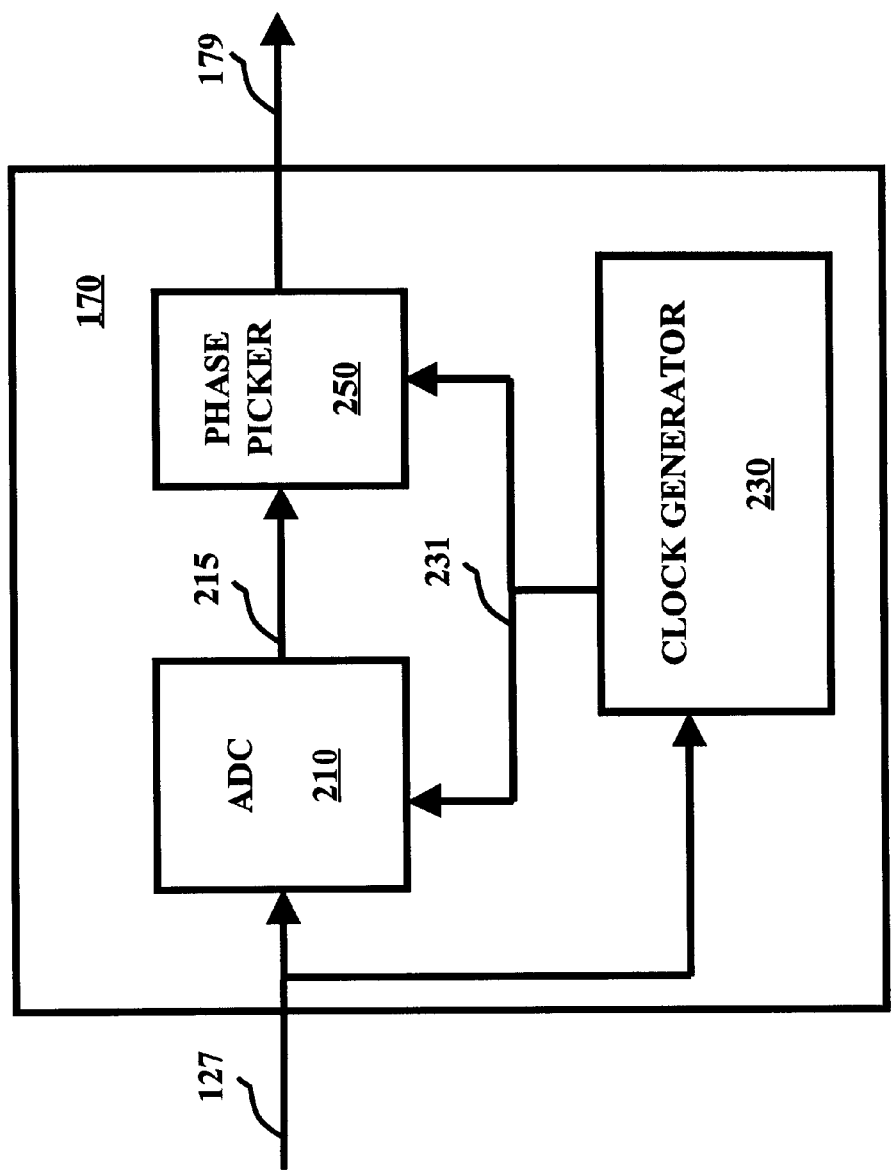
FIG. 2 is a block diagram illustrating a receiver in accordance with the present invention.

FIG. 2 is a block diagram illustrating an embodiment of receiver 170 in accordance with the present invention. Receiver 170 may contain an analog to digital converter (ADC) 210, clock generator 230 and phase picker 250. Each component is described below in further detail.

Clock generator 230 may receive any synchronization signals contained in serial communication path 127, and generate sampling clock signal 231 based on the synchronization signals. Sampling clock signal 231 may have a frequency equal to the oversampling factor times the frequency of encoding of symbols in the signal received on serial communication path 127. Clock generator 230 may be implemented in a known way.

ADC 210 oversamples the signal received on serial communication channel 127 under the control of sampling clock 231. The number of samples approximately equals the number of symbols times the oversampling factor. ADC 210 may also be implemented in a known way to produce discrete data samples represented by one or more bits. Phase picker 250 implemented in accordance with the present invention receives the samples on path 215 and selects the samples representing the symbols encoded in serial communication channel 127.

In some environments, it may be desirable to operate at a lower clock frequency than that described above with respect to clock generator 230. Accordingly, in an alternative embodiment, equally spaced multi-phase clock signals may be generated from clock generator 230, and each phase may be provided to one of multiple ADCs. The samples generated by the ADCs may be processed by phase picker 250.

In a specific implementation described below with reference to FIG. 4, 12 ADCs may be employed to provide 60 samples related to 20 symbols (oversampling factor of 3) every five clock cycles. The sixty samples may be referred to as a "word" in the description here. This implementation may require a clock with only 1/60 the frequency of the clock operating with a single ADC. Phase picker 250 may process the 20 symbols potentially in parallel while minimizing latencies and buffering requirements.

However, the present invention may be implemented with a different level of parallelism (including with just one ADC) as will be apparent to one skilled in the relevant arts based on the disclosure herein. A method illustrating the operation of phase picker 250 operating in conjunction with the implementations of above is described first. An example implementation of phase picker 250 is then described.

4. Method

Figure 3A:
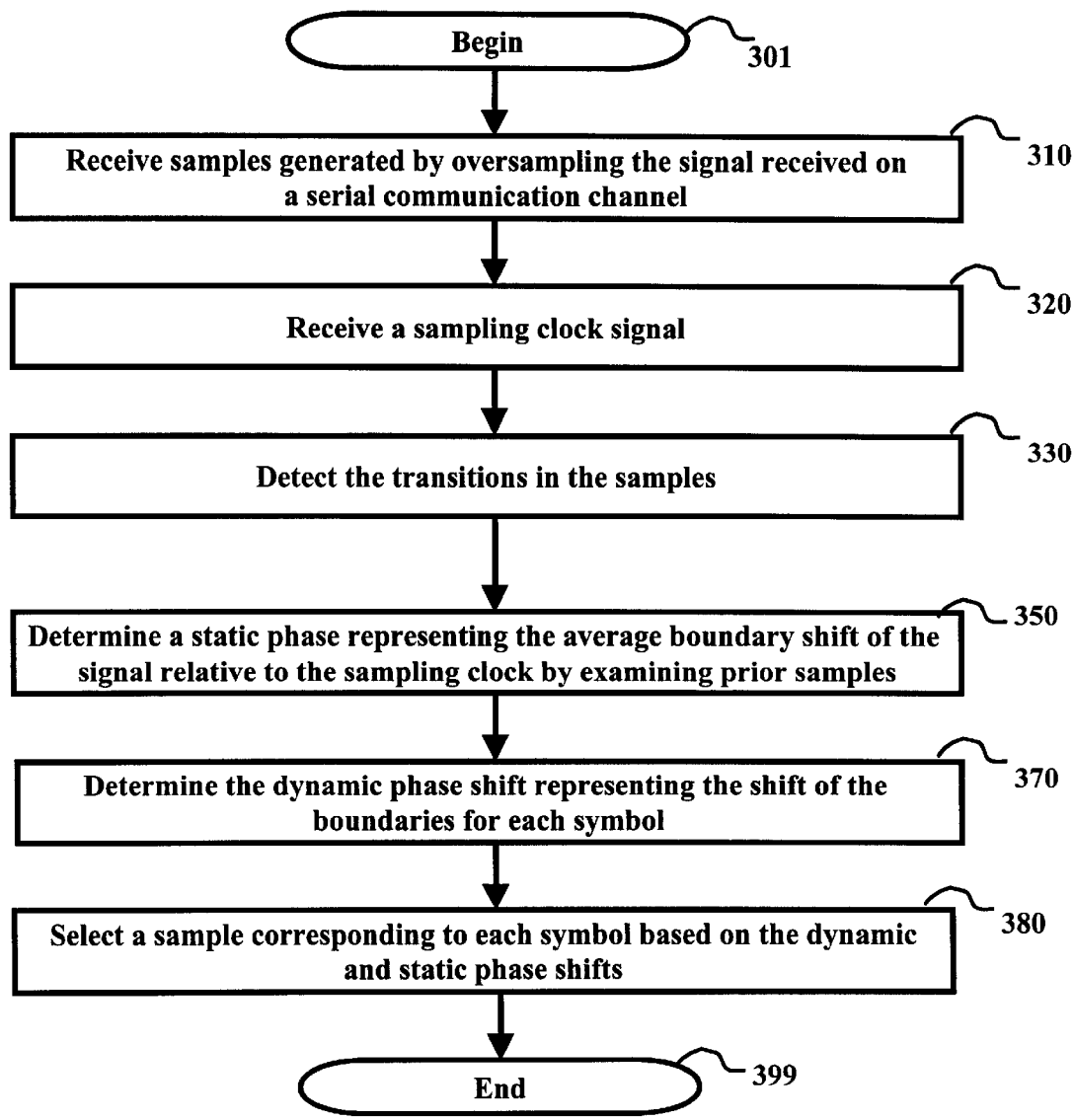
FIG. 3A is a flow-chart illustrating a method of recovering symbols encoded in a serial communication channel in accordance with the present invention.

FIG. 3A is a flow-chart illustrating a method of recovering symbols encoded in a serial communication channel in accordance with the present invention. The flow-chart is described with reference to FIG. 2 for illustration. The method begins in step 301, in which control passes to step 310. In step 310, phase picker 250 may receive samples generated by oversampling a signal received on a serial communication channel. Phase picker 250 may recover the symbols in accordance with the present invention as described below in further detail.

In step 320, phase picker 250 may receive a sampling clock generated, for example, by clock generator 230. In step 330, phase picker 250 may determine the transition in the values of the samples. The transitions are generally indicative of the boundary between successive symbols assuming that the successive symbols have different values.

In step 350, phase picker 250 may determine a static phase shift representing the average boundary shift of the symbol boundaries relative to the sampling clock by examining many samples corresponding to previous symbols. The static phase shift may only determine the approximate samples representing a presently examined symbol due to the short term phase shifts which may not be factored into the static phase shift.

In step 370, phase picker 250 determines a dynamic phase shift representing such short term phase shifts of boundaries. The dynamic phase shifts may be determined by examining the samples corresponding to very few symbols (potentially the current symbol alone) as described below in further detail.

In step 380, phase picker 250 may select one of the samples having the maximum probability of representing the current symbol based on the determined static and dynamic phase shifts. Steps 350 and 370 of FIG. 3 may be repeated each time for selecting a sample in representing each symbol. The static phase status may be updated in the process. The manner in which static phase and dynamic phase may be determined, and the manner in which a sample can be selected as representing a symbol is described in further detail below.

It should be noted that the sequence of steps is merely representative and the steps can be executed in a different order without departing from the scope and spirit of the present invention. In addition, the steps may be executed in parallel, particularly when the symbols are received at a high baud rate. The flow-chart of FIG. 3B illustrates an example implementation making use of such parallelism.

Figure 3B:
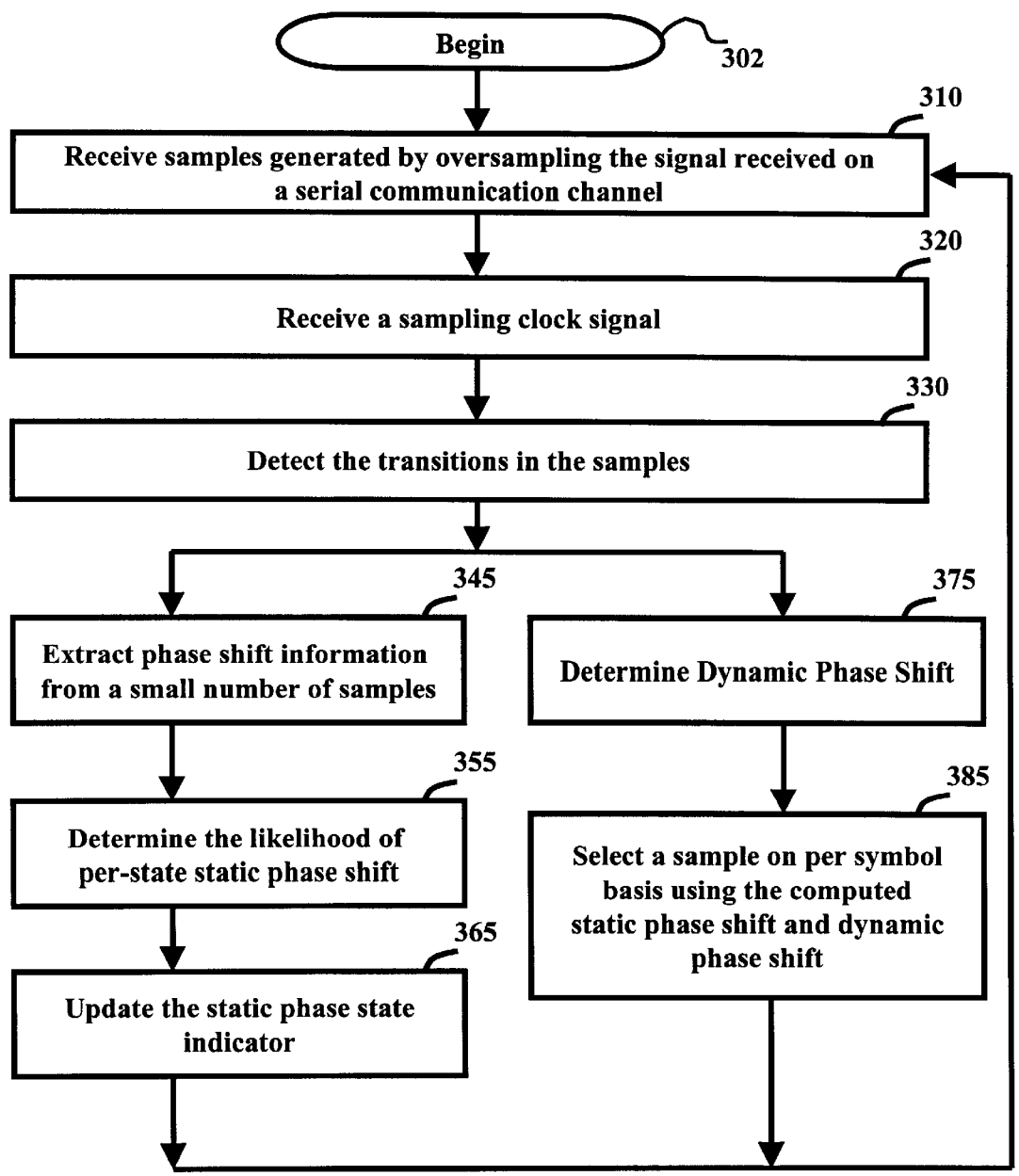
FIG. 3B is a flow-chart illustrating an alternative method of recovering symbols encoded in a serial communication channel in accordance with the present invention.

The method of FIG. 3B begins in step 302, in which control passes to step 310. Some of the steps of FIG. 3B may be implemented similar to those in FIG. 3A. In such cases, similar numerals are used for the steps of FIG. 3B. The description of the steps is not repeated in substantial respects in the interest of conciseness.

Thus, samples generated by oversampling are received in step 310, a sampling clock is received in step 320, and the transitions in sample values are detected in step 330. As described in further detail below, the determination of static phase and the per-symbol selection may be implemented in parallel. As a result, the present invention is particularly suited in high speed environments in which the symbols are encoded at a high baud rate.

In step 345, the phase shift information may be extracted from the transitions (detected in step 330) present in a small number of samples, potentially from each pair of symbols. Based on the phase information extracted in step 345, the likelihood of per-state static phase shift may be determined. As the static phase status may be in one of three states (early, late, and neutral), the probability of the static phase being in one of the three states may be detected. Determining such probabilities may be important, for example, because some of the determinations of step 345 may be erroneous or not otherwise reflecting the long-term phase shifts represented by the static phase indicator.

In step 365, the status of the static phase status may be determined based on the per-state probability. Appropriate weights may be assigned to the per-state probabilities and the information extracted in step 345 to achieve a desired level of responsiveness (loop bandwidth) for the static phase indicator. The static phase indicator is used in the selection of the samples on a per-symbol basis.

In step 375, the dynamic phase shifts may be determined by examining the transition information of a few samples. In step 385, the samples are selected on a per-symbol basis using the static phase indicator computed in step 365 and the dynamic phase shift determined in step 375. Fairly complex computational approaches can be implemented in the determination of the static phase as the samples selection and the static phase indicator determination are performed in parallel. An example embodiment implementing the flow-chart of FIG. 3B is described below in further detail.

5. Static and Dynamic Phases

The manner in which the static and dynamic phases may be used conveniently in the selection of the samples as representing the corresponding symbols is described with an example in which the symbol alphabet containing two elements (designated as 0 and 1), and with a oversampling factor (L) of 3. However, it should be understood that the present invention may be implemented with a different oversampling factor (greater than or less than 3) and with symbols having more states as will be apparent to one skilled in the relevant arts based on the disclosure herein.

As noted above with reference to step 330 of FIG. 3, phase picker 250 may first need to detect the transitions in the samples. A transition may be determined to be present if two successive samples have different values. Thus, in the case of symbols with alphabet containing two states, a transition may be deemed to be present if a pattern of 01 or 10 is detected. The transitions may be examined to determine the appropriate sample representing a symbol as described below with reference to the entries in Appendix A also.

Appendix A includes sequences resulting from comparison of successive samples corresponding to three consecutive symbols. There are 64 sequences corresponding to the 64 ($4^3$) possible cases. The 4 possibilities correspond to Run (R), early (E), late (L) and neutral (N) for each of the three (3) symbols. When the symbol is shown with a Run, no transitions are present, and thus the corresponding comparison points are shown with a sequence of 000. When early, the comparison points are shown as 100, when neutral as 010, and when late as 010. The first line of each of the sequences depicts the specific case. For example, sequence numbered 44 showing LRE, indicates a case when the previous symbol is late, the present symbol has a run, and the next symbol is early.

Figure 13:
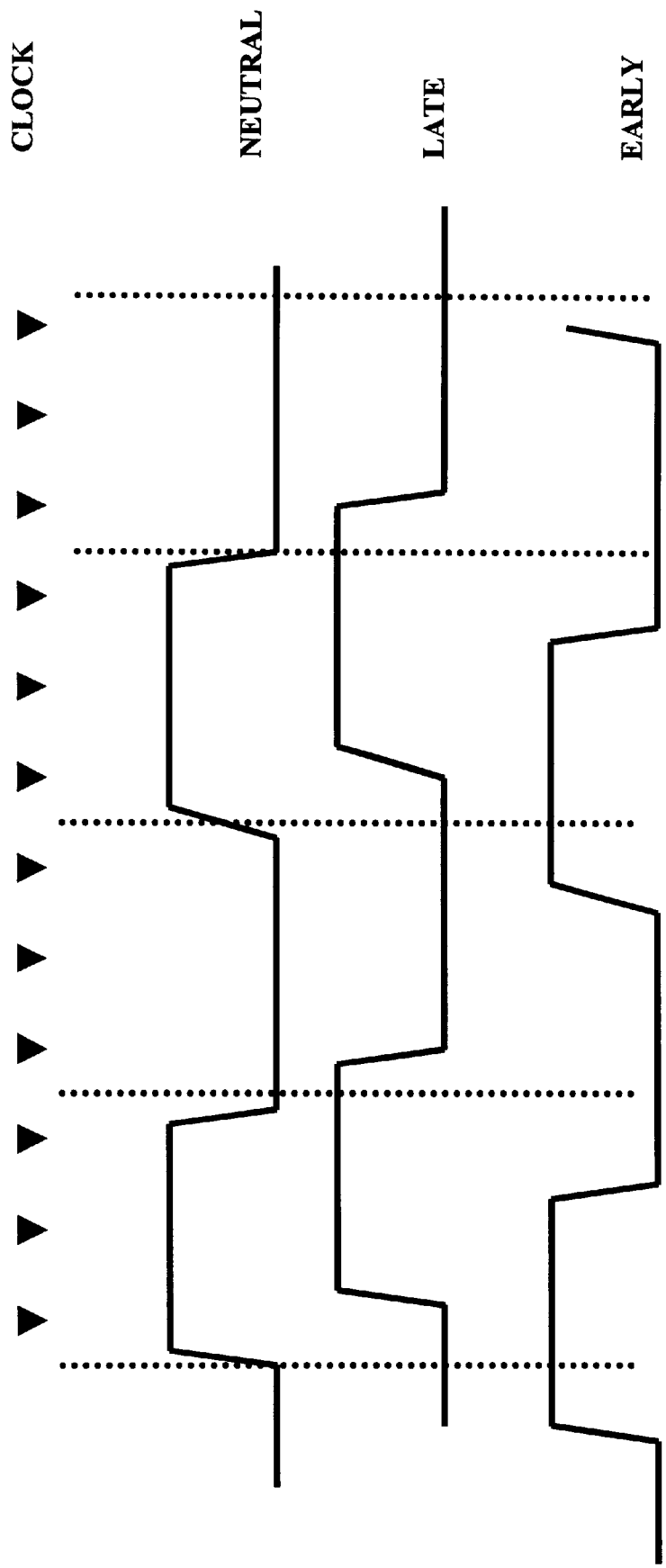
FIG. 13 is a timing diagram illustrating the neutral, late and early phases as used in the description of the present application.

The manner in which a sample would need to be selected when the static phase is early (PE), neutral (PN), or late (PL) is described in the below paragraphs. As depicted in FIG. 13, in a neutral state, the symbol boundaries are consistent with the sampling clock (CLOCK). In the late state, the signal arrives later than that determined by the sampling clock. In the early state, the signal arrives earlier than that determined by the sampling clock.

Continuing with reference to Appendix A, sequences 0–63 are described with example reference to comparison pattern 0 (EEN status for the three symbols) containing 'X100100100XXX', wherein 0 indicates that there is no change and 1 indicates that there is a change. The samples corresponding to three symbols are shown as 'PPPCCCNNNNNNN', with PPP representing the three samples for a previous token, CCC representing the samples for a current token, and NNN representing samples for a next token.

The stream of samples are assigned to three tokens. Each token contains three samples, corresponding to oversampling factor of 3. The middle token corresponds to the current symbol from which a sample is to be selected. The X mark at either end indicates that the value is not relevant to the analysis.

Three lines marked PE (phase early), PN (phase neutral), and PL (phase late) are shown for each of the sequences. In the case of PN, pattern 0 is interpreted as having three tokens, T001, T001, T00X, with each token having data points representing three (equal to oversampling factor) comparisons. In this case (line), either A or B (one of the first two samples corresponding to the current symbol) represents the symbol.

In the case of PE (early static phase) for pattern 0, tokens of T100, T100, T100 are generated and any of the samples A, B, C (three samples) corresponding to the current token would represent the current symbol. In the case of PL for pattern 0, only the first sample would accurately represent the current symbol.

It should be noted that due to conditions such as phase jitter, more than or less than three samples may be generated for a symbol. For example, in the case of pattern 1, four samples (designated as Cs) are shown for the current symbol. In the case of pattern 8, only one sample is shown for the current symbol.

The result of the examination of Appendix A may be summarized as shown in Table I contained in Appendix B. The results are described in further detail now.

When the current token equals T000, any of the three samples (A, B or C) may be selected irrespective of the state of the static phase. Intuitively, when no transitions are detected for the current token, any of the samples appropriately represents the current symbol (corresponding to the current token). Similar result is observed for token T100, in which case the transition is appropriately detected between the previous symbol and the current symbol and no other transitions are detected with respect to the present token.

In case the current token equals T011, the second sample B would be the appropriate sample for selection irrespective of the state of the static phase. In this case, a static phase of early or late would be characterized as an error because such a sequence should not occur in late or early states. In general, the entry 'None' in the columns related to Early, Neutral and Late, indicate that the corresponding sequence should not occur or is invalid. Similarly, if current token equals T101, either of the first two samples A or B represents the current symbol. If current token equals T110, the first sample A would represent the current symbol.

However, when the present token equals T001 or T010, the specific sample to be selected depends on the static phase. In case of T001, sample C (third sample) is to be selected if the static phase is early, and sample A or B may be selected otherwise. In case of T010, sample A is to be selected if the static phase is late, and sample B or C otherwise.

The other token T111 generally represent an error condition, and any approach may be used in generating a sample representing the current symbol. It should be noted that the embodiment implementing Table I may support any degree of static phase shift and dynamic phase shift equal to one sample in either direction (early or late).

From the above description it may be noted that the specific sample for a symbol may be selected based on minimal processing. For many of the tokens (e.g., T000 and T101), the sample may be selected without any additional considerations. For two tokens T001 and T010, the static phase status may be used to select from among the samples. Even in such a case, the selection may be performed immediately upon the availability of the samples.

Accordingly, the present invention is particularly useful in systems operating in high speed environments in which the processing is to be limited. The manner in which the static phase status may be computed is described with an example implementation of phase picker 250 below.

6. Phase Picker

Figure 4:
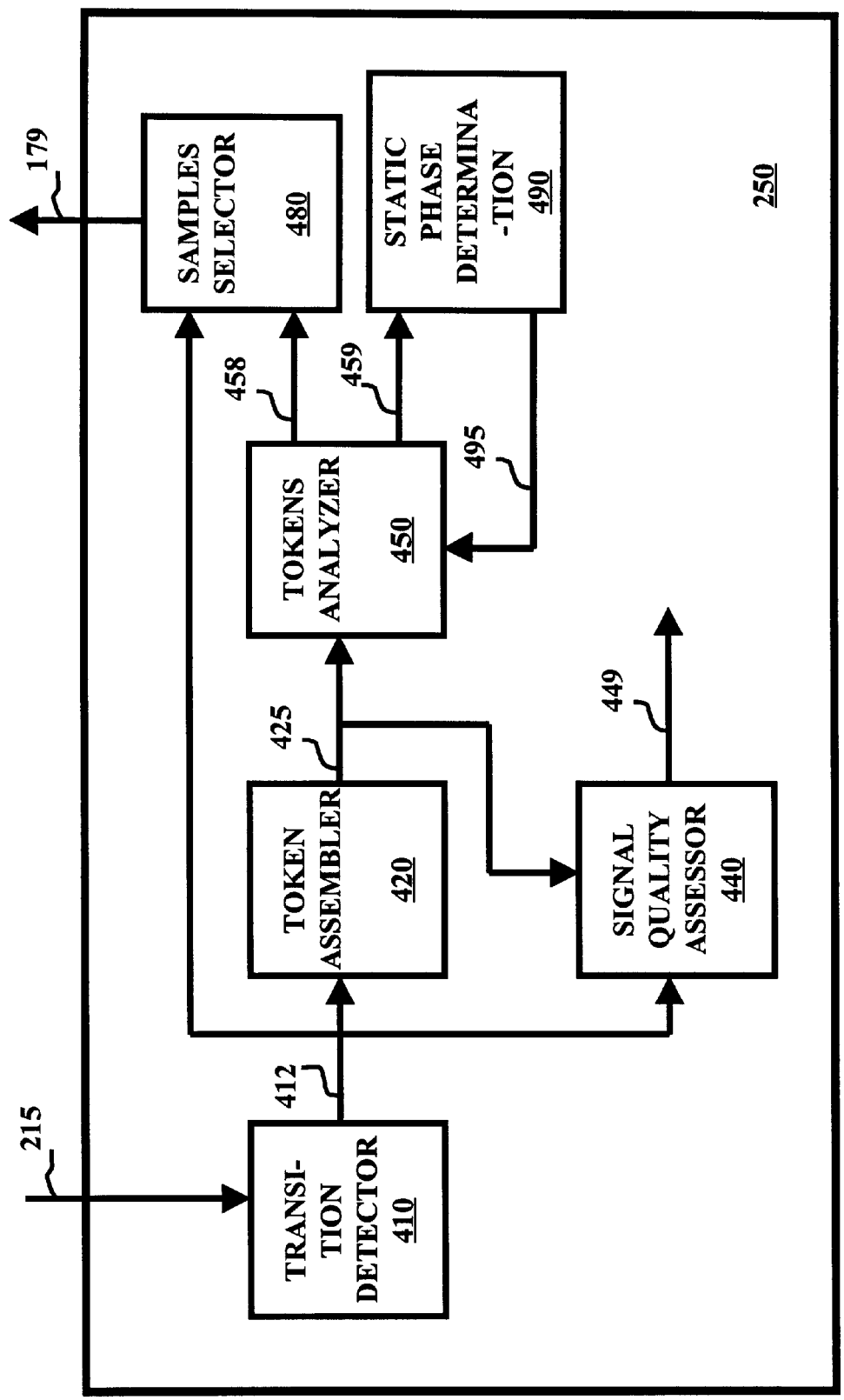
FIG. 4 is a block diagram illustrating an embodiment of phase picker implemented in accordance with the present invention.

FIG. 4 is a block diagram illustrating an embodiment of phase picker 250 in accordance with the present invention.

Phase picker 250 may contain transition detector 410, token assembler 420, signal quality assessor 440, tokens analyzer 450, samples selector 480, and static phase determination circuit 490. Each block is described in further detail below.

Transition detector 410 receives samples representing the symbols encoded in a serial communication channel, and generates transition indicators indicating whether transitions are present between any two samples. Transition detector 410 can be implemented in one of several ways. An example embodiment of transition detector 410 is described below with reference to FIG. 5.

Token assembler 420 may generate tokens containing multiple transition indicators. In one embodiment, each token contains a number of transition indicators equal to the oversampling factor employed in sampling a received signal. The tokens are passed to tokens analyzer 450 and signal quality assessor 440 on bus 425.

Tokens analyzer 450 may examine the token and generate a number on path 458 indicating which of the L (L being the oversampling factor) samples is to be selected for a given sample. In general, the present invention allows a sample to be selected with minimal examination of the prior history by basing the selection on both dynamic and static phase shifts.

In the examples above of Table I, for many tokens, the specific sample to be selected may be based on mere examination of the transition indicators in the token. However, for some tokens, the status of the static phase may be necessary. The status of the static phase may be indicated on path 495. Thus, based on status information available on path 495 and by examining the transition indicators in a token (or a few tokens), tokens analyzer 450 determines the specific sample to be selected, and indicates the same to samples selector 480.

In addition, tokens analyzer may provide any information on the phase shifts by examining the tokens. In general the phase shifts are based on the specific sequence of tokens received on path 425. Accordingly, the data sent on path 459 may be referred to as 'sequence identifiers'. Alternatively, only the phase information may be sent on path 459, in which case the information may be referred to as 'phase identifiers'. In the present application, the two terms are used interchangeably. This information may be used by static phase determination circuit 490 in determining the present static phase status. An embodiment of tokens analyzer 450 is described below in further detail.

Samples selector 480 selects one of the samples corresponding to each symbol as specified by tokens analyzer. In one embodiment, samples selector 480 may be implemented as a multiplexor which accepts three (equal to oversampling factor) inputs, and selects one of the three inputs determined by tokens analyzer 450. As the determination by tokens analyzer 450 may be performed quickly in accordance with the present invention, substantial pipelines may be avoided in samples selector 480. In an implementation, the determination may be performed within a clock cycle so that samples selector 480 may be implemented without any memory elements (pipelines).

Signal quality assessor 440 may examine the samples and/or tokens to determine the quality of the signal received on a serial communication channel. In one embodiment, several counters may be maintained, with each counter counting the occurrences of specific unusual events. For example, one counter may count the number of occurrences of symbols determined to contain only one sample. Another counter may count the number of error situations, for example, receiving a token T110 when the static phase indicates early in the example of Table I. Based on the counters, the quality of the signal may be assessed and corrective action (such as receiver adaption well known in the relevant arts) may be initiated by sending any desired signals on path 449.

Static phase determination circuit 490 may examine the sequence identifiers received on path 459, and determine the status of the static phase. The status of the static phase (early, neutral or late) may be indicated on path 495. An embodiment of static phase determination circuit 490 is described below in further detail. First, an embodiment of transition detector 410 is described below.

7. Transition Detector

Figure 5:
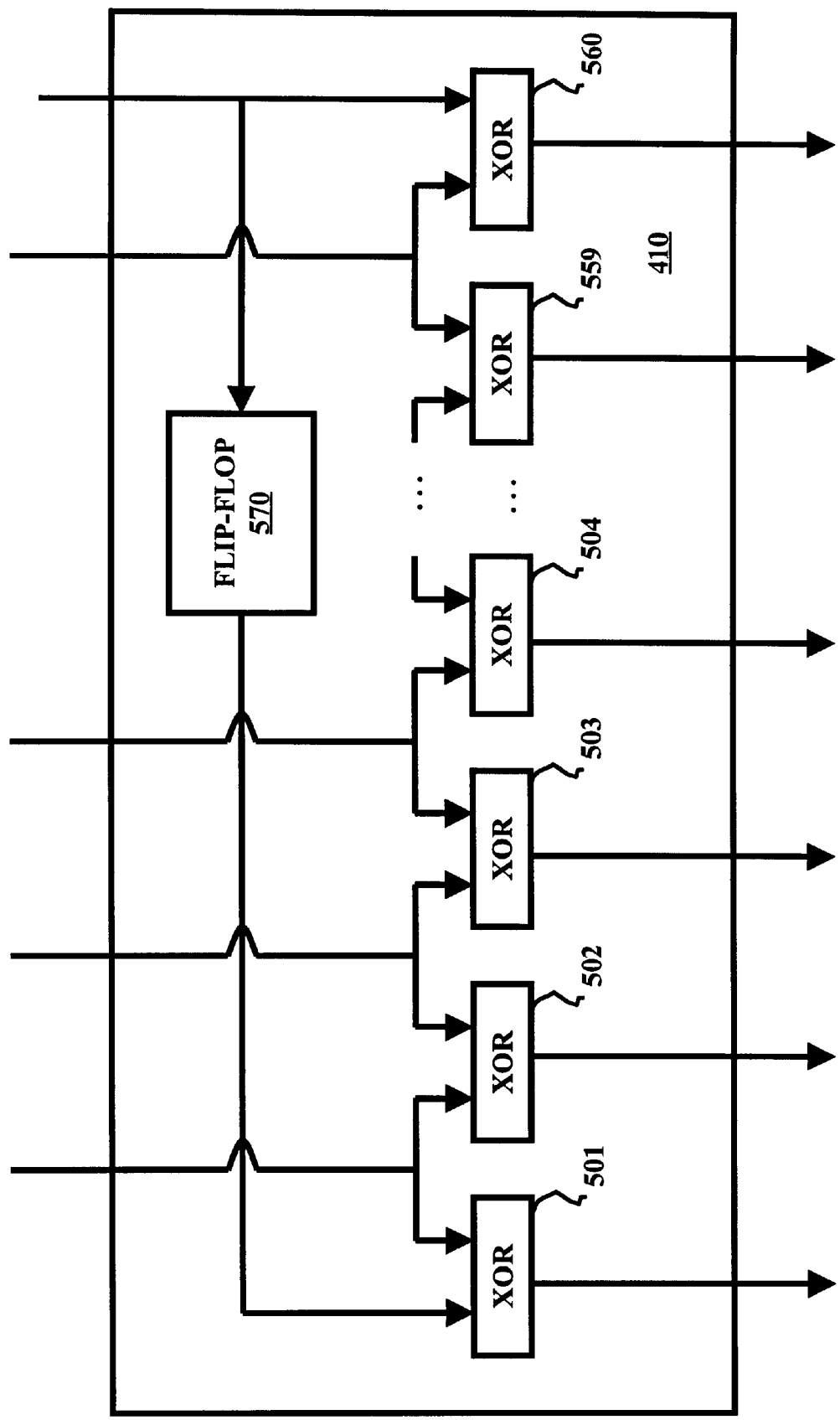
FIG. 5 is a block diagram illustrating an embodiment of transitions detector in accordance with the present invention.

An embodiment of transition detector 410 is depicted in FIG. 5. The embodiment is implemented to receive 60 samples corresponding to 20 symbols, with each symbol being either logical 0 or logical 1. It should be noted that the present invention can be used with symbol alphabets having more elements (than two). Transition detector 410 may contain 60 XOR gates 501–560, and flip-flop 570.

Each XOR gate receives two samples (from two corresponding ADCs) and generates a 1 as an output if only one of the inputs is a one, thereby being indicative of a transition. Flip-flop 570 may store the 60$^{th}$ sample as an input for the first XOR gate 501. Accordingly, each output (transition indicator) of the XOR gates 501–560 contain a 1 to indicate the presence of a transition and a 0 to indicate the absence of a transition.

Token assembler 450 generates each token containing three successive transition indicators, and passes the token to tokens analyzer 450. In general, token assembler 450 may be viewed as logical 'bussing' of the transition indicators. An embodiment of tokens analyzer 450 which processes the output of token assembler 420 is described in detail below.

8. Tokens Analyzer

Figure 6:
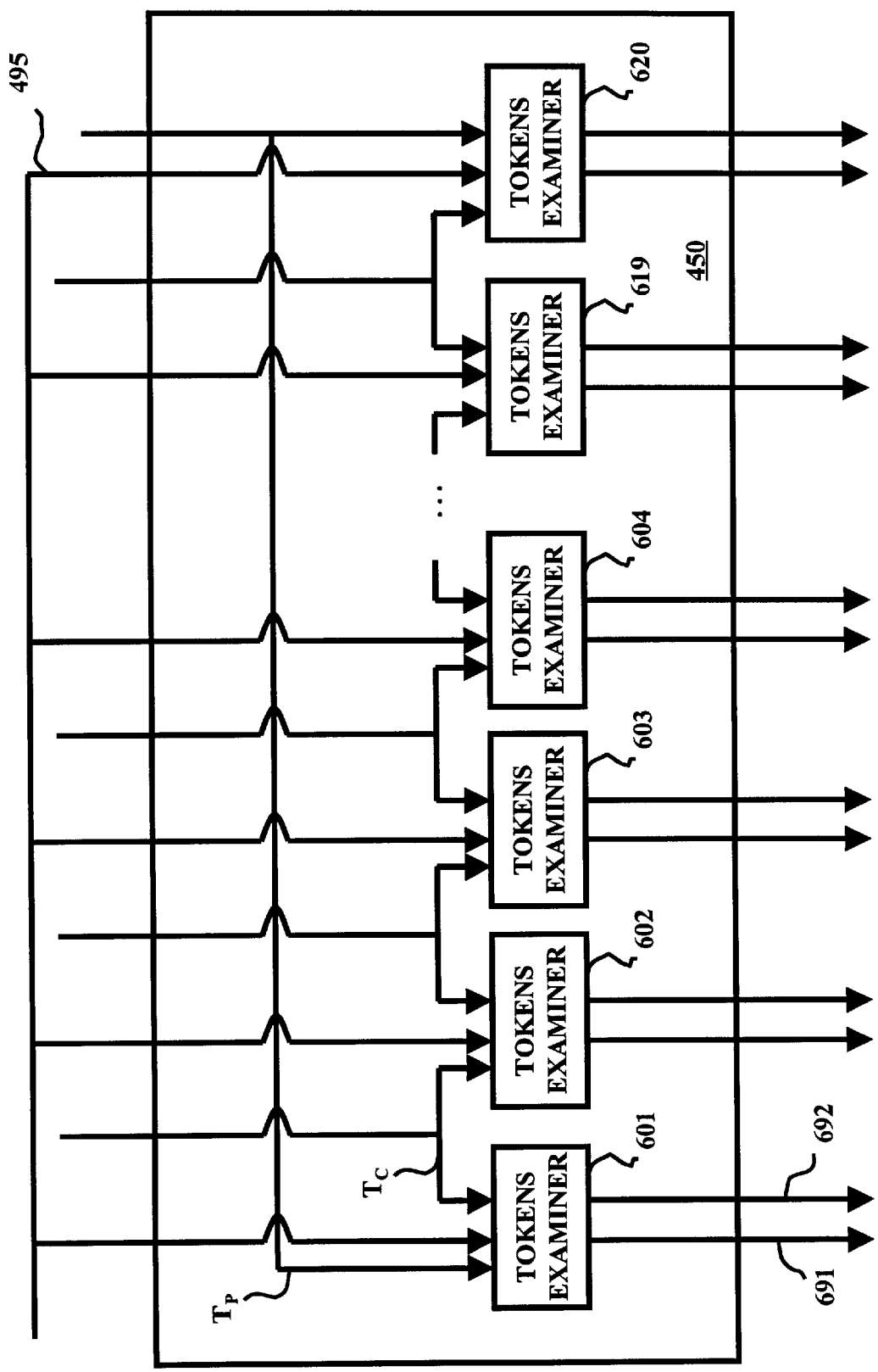
FIG. 6 is a block diagram illustrating an embodiment of tokens analyzer in accordance with the present invention.

FIG. 6 is a block diagram illustrating an embodiment of tokens analyzer 450 in accordance with the present invention. Tokens analyzer 450 may contain 20 token examiners 601–620, each generating two outputs. The token examiners are described with example reference to token examiner 601 below.

Token examiner 601 may receive two tokens $T_P$ (previous token) and $T_C$ (current token), and static phase status 495, and generate two outputs 691 and 692. Output 691 may indicate the specific sample to be selected corresponding to the current token, and may thus be contained in path 458. As noted above with reference to Table I, token examiner 601 may determine the specific sample to be selected by examining only the current token and the current status of the static phase. In general, the present invention minimizes the examination of the number of prior tokens by considering both the static phase and the boundary information.

Output 692 contains sequence identifiers (SIDs) which are used to determine the status of the static phase. Accordingly, output 692 may be contained in path 459. The manner in which SIDs may be determined and used in an example environment is described in further detail below.

9. Sequence Identifiers

In the embodiment(s) of FIG. 6, tokens examiner 601 examines a current token and a previous token to determine a sequence identifier, which indicates the static phase information available from examining the two tokens. Table II contained in Appendix C summarizes the phase information that may be derived from different token sequences.

The entries of Table II may be derived from the information in Appendix A. For example, in entry 1 of Table II, a token sequence of T000 and T101 is shown indicating that the phase identifier is 'Not E' (not early). The conclusion is based on examination of the following patterns in Appendix A:

Pattern 4 (PN): 1.000.101.00X.X-T000, T101, T00X
Pattern 9 (PL): 0.000.101.0XX.X-T000, T101, T0XX
Pattern 25 (PL): 1.000.101.0XX.X-T000, T101, T0XX
Pattern 52 (PN): 0.000.101.00X.X-T000, T101, T00X
Pattern 57 (PL): 0.000.101.0XX.X-T000, T101, T0XX Thus, tokens examiner 601 may generate a phase identifier based on examination of the two tokens. As may be readily noted from Table II, the phase identifier may some times indicate what the phase is (i.e., neutral, late or early), and some times may indicate what the phase is not (i.e., not neutral, not late or non early). Some other token sequences may be invalid or not provide any phase information. Tokens examiner 601 sends the phase identifier to static phase determination circuit 490, which may generate static phase status 495 as described below.

10. Static Phase Determination Circuit

As the speed of static phase deviation is usually slow compared to the symbol rate, the effective control loop bandwidth of the static phase determination circuit may need to be relatively narrow. In some environments, bandwidth of $1/100$ to $1/1000$ of baud rate (encoding rate of symbols) provides satisfactory results. The low bandwidth typically enables the implementation of elaborate approaches compared to the tokens analyzer 450 which may need to operate at the symbol rate.

With respect to tokens examiner 601 described above, phase identifiers which indicate what the phase is (e.g., items 8–13 in Table II above), will be referred to as hard identifiers. Phase identifiers which indicate what the phase is not (e.g., items 3–5 of Table II), will be referred to as soft identifiers. As may be readily observed, the hard identifiers provide more unambiguous information regarding the boundaries of the symbols in comparison to the soft identifiers.

The hard and soft identifiers may be used in various ways to determine the static phase. According to one feature, if a soft identifier is detected up to 40 symbols ago indicates that the state is either late or neutral (e.g., as in item 1, not early), and the current soft sequence indicates the state is early or late (e.g. as in item 7, not neutral), there is a high likelihood the current static phase state is late (by taking set intersection). Similarly, if a hard identifier received recently was showing the state as neutral and a current soft identifier indicates that the phase is either neutral or late, then there may be good probability that the current state is still neutral. In this case, the soft identifier reinforces the indication provided by the previous hard identifier.

If a soft identifier cannot be resolved over some number of symbols (e.g., 80 symbols), the soft identifier may be determined to be 'stale' and removed from the history. Thus, unless resolved, soft identifier may not contribute to the calculation of the per phase likelihood scores. It may be appreciated that this is a conservative approach which prevents high speed fluctuation of the static phase state, thus limiting the static phase tracking bandwidth. The length of the sequence identifiers history determines the noise immunity and effective bandwidth of the tracker.

Figure 7:
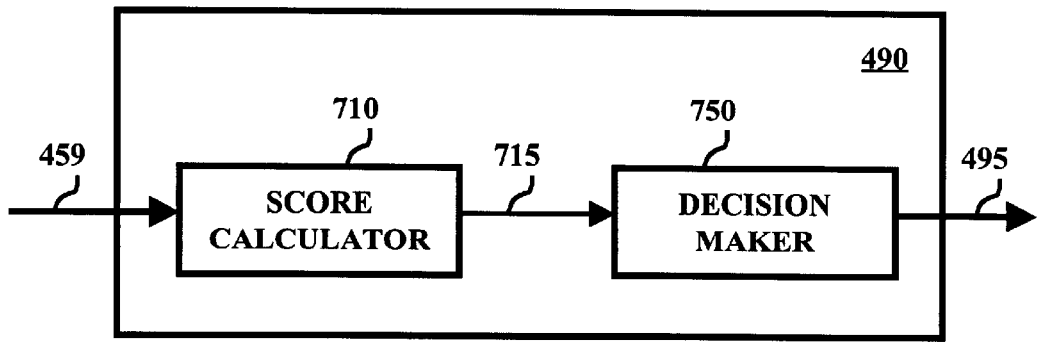
FIG. 7 is a block diagram illustrating an embodiment of static phase determination circuit in accordance with the present invention.

An example implementation of static phase determination circuit 490 is now described with reference to FIG. 7. Static phase determination circuit 490 may contain two blocks, score calculator 710 and decision maker 750. Score calculator 710 may examine the phase identifiers (or sequence identifiers) generated by tokens examiners 601–620, and determine a likelihood score (probability) for each possible static phase state: Early, Neutral and Late.

Decision maker 720 may then check scores associated with each possible static phase, and make a determination of the static phase that has the maximum probability. Data indicating the determination may be provided on current static phase 495. Example embodiments of score calculator 710 and decision maker 720 are described below in further detail.

11. Score Calculator

Figure 8:
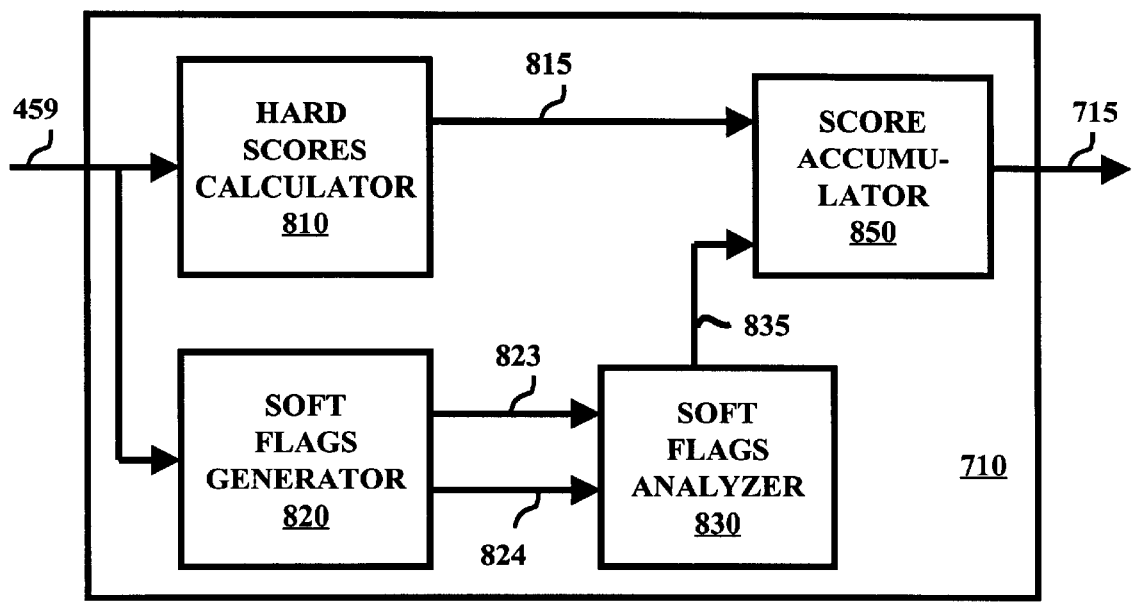
FIG. 8 is a block diagram illustrating an embodiment of score calculator in accordance with the present invention.

An embodiment of score calculator 710 is depicted in FIG. 8. Score calculator 850 may contain hard scores calculator 810, soft flags generator 820, soft flags analyzer 830, and score accumulator 850. Hard scores calculator 810 generates scores based on hard identifiers. Soft flags generator 820 and soft flags calculator together generate scores based on soft identifiers. As described in further detail below, the scores are generated for each phase identifiers word, i.e., the identifiers generated by the 20 token examiners 601–620 of FIG. 6.

Hard scores calculator 810 may receive the sequence identifiers from the tokens examiners, and determine whether a received phase identifier is a hard identifier. Hard scores calculator 810 may maintain a score (or history in general) corresponding to each of the three possible phases (early, late and neutral) and modify the counters based on the type of hard identifier received. As an illustration, if a hard identifier indicating a late state is received, the score for the late phase may be incremented by some constant weight HW (say, equal to 4) and the other two scores corresponding to early and neutral states may be decremented by half of this weight (i.e. HW/2; say, by 2).

Thus, in effect, the detection of a hard identifier shifts the likelihood (probability) of the static phase toward the detected state, and away from the other two states. For example, if a hard identifier indicates the presence of a late phase, the likelihood moves toward the late state and away from early and neutral states. The scores corresponding to the three states may be sent to score calculator 850 on path 815.

Soft flags generator 820 may maintain a history of the previous phase identifiers and provide two sets of flags: current flags 823 and persistent flags 824. Current flags 823 may identify whether each of the three possible state indicators is present in the current identifiers word. Current flags 823 may also contain error flags.

Persistent flags 824 may also contain multiple flags. Persistent flags 82 may be derived from the history and in effect provide persistence to the current flags over several symbol periods (e.g., 80). Once set, a persistent flag remains set for certain number of symbols. Soft flags generator 820 also detects invalid sequences (such as T001, T101) and sets the corresponding current and persistent error flags.

Also, soft flags generator 820 may not add the flags to the history if an invalid sequence has been detected. Thus, the persistent flags are generally not affected by potentially erroneous sequences possibly arising from amplitude or phase noise in excess of receiver tolerance levels. Such a feature provides improved noise immunity and robustness of receiver 170.

Soft flags analyzer 830 examines current flags 823 and persistent flags 824 and calculates corresponding per phase soft scores deltas. For example, if current flags (for a word) indicate the phase is N or L (by raising NL flag) and no other flags are set in the current word, soft flags analyzer 830 may examine the persistent flags. If the persistent EL flag is set, this means the ambiguity may be resolved as a late state.

Accordingly, the soft delta score corresponding to the late state may be incremented by some constant weight SSW (soft single weight, e.g., 1) and two other deltas (Early and Neutral) may be decremented by the same weight SSW.

Thus, in effect, the likelihood (probability) shifts away from state excluded by current soft identifier unconditionally; however, it is steered away from states excluded by previous soft IDs in the history. Thus, the likelihood shifts toward resolved state (Late in our example).

If more than one flag is set for the current word, soft flags analyzer 830 may generate the soft scores based merely on current flags, thus ignoring the history. Such an approach improves state acquisition speed and robustness. For example, if both current NL and LE flags are set, the likelihood shifts away from E and N because such a states are excluded by the flags; thus, in effect, the likelihood shifts toward Late state which is resolved state for the current flags. In out example, the Late delta will be incremented by MSW constant (multiple soft weight; say, 2) and other deltas will be decremented by SSW (single soft weight, see above).

Hard flags can also indirectly participate in the process of likelihood shifting by aiding in the soft IDs resolution. The selection of delta weights and persistent length determines the dynamic response of the system and the robustness. The lower the relative weights, the higher robustness and the slower the static phase state acquisition. For possible phase picker adaptation support, delta weights may be made programmable or selectable by the software and hardware adaptation mechanism. This will provide a great deal of flexibility in tuning the dynamic response of the phase picker.

Score accumulator 850 may receive hard deltas (815) and soft deltas (835), and add the received scores to the currently accumulated per phase scores. The accumulators may be clamped on both positive and negative sides. The possible accumulator range determines the dynamic properties of the system. The wider the range, the slower the tracking (i.e. the narrower bandwidth) for the fixed set of delta weights (see above). In an embodiment with the weights in the range of 1 to 4 and N=20 (as in FIG. 6), a range of −128 to 127 is used for the accumulator. However; more optimal range suited for specific environments may be selected based on experiments.

The accumulation range may also be made adjustable under control of the software, etc. This provides a way for dynamic adaptation of the tracker bandwidth to the current system conditions. For example, during an initial synchronization period, the control software may select wide bandwidth by reducing the accumulation range (say, down to −16 to 15), which may provide fast convergence toward maximum likelihood phase state.

Once the synchronization is completed, the bandwidth may be reduced by increasing the accumulation range to −1024 to +1023 thus improving the receiver robustness. To improve the acquisition speed, the accumulators are reset to 0 at the beginning of the synchronization process and any time the receiver synchronization is deemed to be lost. Per phase scores 715 are provided to decision maker 750 to determine the current static phase state having maximum likelihood.

12. Decision Maker

Figure 9:
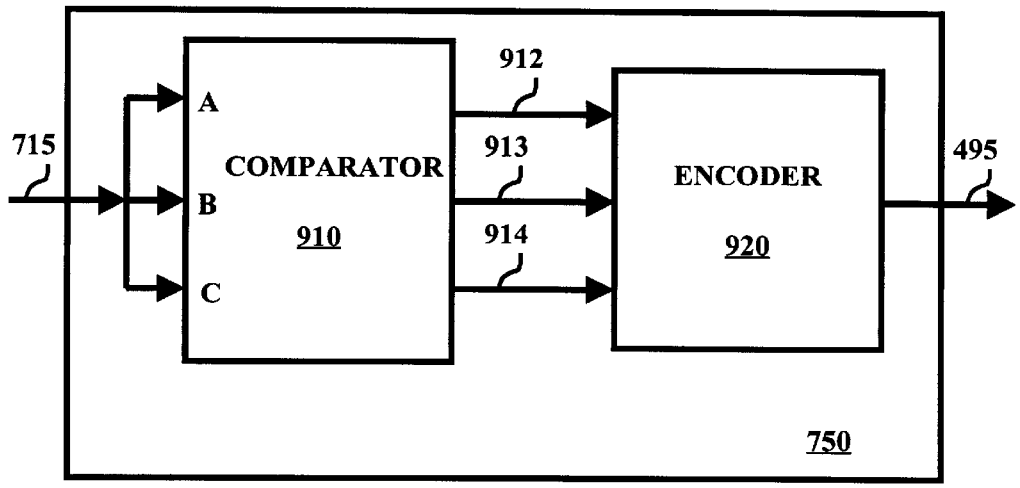
FIG. 9 is a block diagram illustrating an embodiment of decision maker in accordance with the present invention.

FIG. 9 is a block diagram illustrating an embodiment of decision maker 750 in accordance with the present invention. Decision maker 750 may include a three-way comparator 910 and 3-2 encoder 920. As described below in further detail, the two components may operate to generate the following results:

if ES>NS and ES>LS then selected state=EARLY;

else if NS>ES and NS>LS then selected state= NEUTRAL;

else selected state=LATE, wherein ES, LS, and NS represent the scores corresponding to the early, late and neutral states respectively; and '<', '>' and '=' represent the logical less than, greater than, and equal to signs.

Comparator 910 may receive per phase scores corresponding to the three states on path 715. The inputs (ES, NS, and LS) corresponding to the early, neutral and late scores may be received on inputs A, B, and C respectively. Line 912 is asserted (to a logical 1) if C<A>B, line 913 is asserted if A<B>C, and line 914 is asserted if B≦C≧A. Encoder 920 encodes the three bits into a two bit output on path 495.

For example, if scores are ES=−3, NS=12 and LS=6, the Neutral phase will be selected. In case of ambiguity (e.g., ES=−3, NS=0, LS=0), current phase state remains unchanged. Alternatively, one comparison may be done for greater or equal and all other for strictly greater; thus, ambiguity will be resolved toward the former state as described above.

More elaborate approaches can be used for making a decision. For example, one might examine the speed of change of the corresponding scores (i.e. look on the difference). If there is a steady shift of likelihood toward some particular state, this state may be selected speculatively so the phase picker recovery time will be minimized. However, in many cases simple three way comparison works well.

Thus, the static phase information generated by decision maker 750 may be used by tokens analyzer 450 in determining which of the samples to select to represent the symbols encoded in a serial communication channel. The description of receiver 170 is continued with reference to signal quality assessor 440.

13. Signal Quality Assessor

Signal quality assessor 260 may provide some indication about the signal quality received on serial communication channel 127. Such an indication may be used to perform receiver adaptation strategy such as equalizer control and channel termination control in ADC 210. One approach is based on the calculations of the percentage of the narrow symbols (i.e. symbols with the width of only one sample as compared to the nominal width of L=3 samples). The narrow symbols may indicate mis-equalization and mis-termination of the channel. The adaptation strategy may be based on selecting the receiver parameters which will yield the lowest average rate of narrow symbols.

Figure 10:
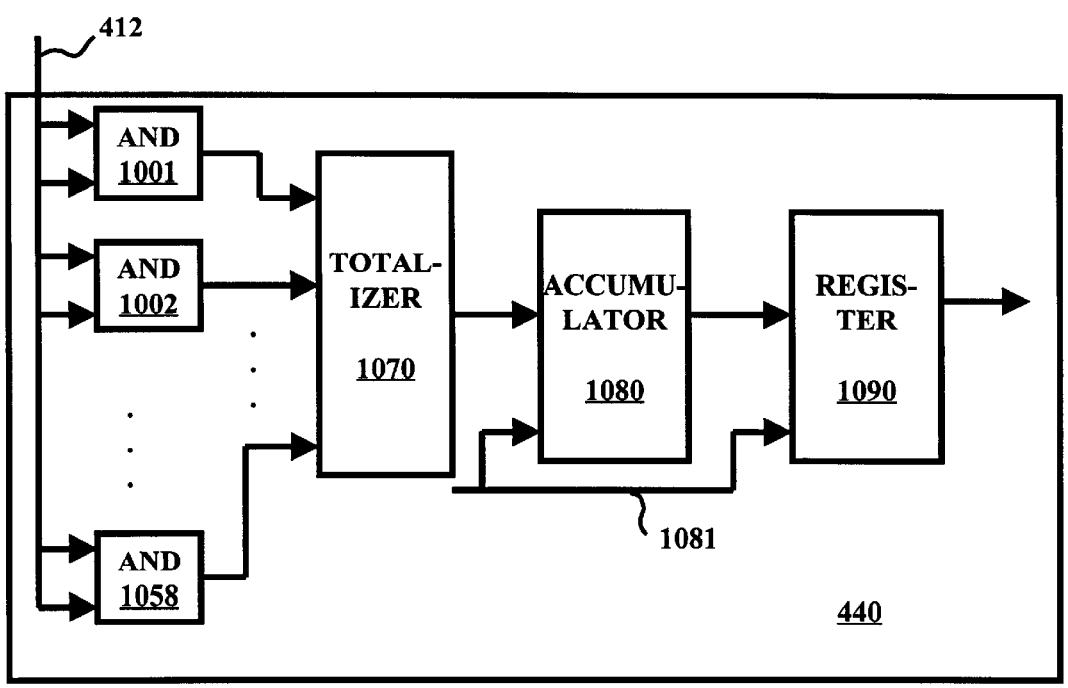
FIG. 10 is a block diagram illustrating an embodiment of quality signal assessor in accordance with the present invention.

One embodiment for implementing such an approach is depicted in FIG. 10. Signal quality assessor may contain 58 AND gates 1001–1058, totalizer 1070, accumulator 1080, and register 1090. Each AND gate may receive a pair of successive transition indicators. The output of each AND gate is a 1 if a symbol is present with only one sample. Thus, the number of ones in the output of AND gates 1001–1058 represents the number of narrow symbols in the current word.

Totalizer 1070 may count the number of ones in a received transition word. Accumulator 1080 adds the number received from totalizer 1070 to an internally stored aggregate sum. Signal 1081 resets the value in accumulator 1080. In one embodiment, the clearing operation may be performed every 1024 clock cycles (i.e. 20K symbols) if the receiver is applied in the data communication environment. On other hand, for the video or graphics interfaces, such as DVI or DFP digital monitor interfaces, the clearing operation may be performed every image frame because frame to frame image contents may change very little if any thus allowing the quasi stationarity assumption about the input signal.

Register 1090 receives the accumulated number, and provides the data for further analysis. Signal 1081 also enables transfer of the value stored in accumulator 1080 into register 1090. The output of register 1090 is held until the end of the next accumulation period. The data may be examined to determine any necessary corrective action, for example, in adjustments to ADC 210 as noted above. The description is continued with reference to some example environments in which the present invention may be used.

14. Example Environment

Receiver 170 may be used in several environments in accordance with the present invention. Such environments include, among others, fibre channel, universal serial bus (USB), data storage equipment, display units, etc. In general, the present invention may be used to recover the samples encoded in any serial communication channel. Further, even though the embodiments here are described substantially with reference to a symbol alphabet containing two elements (i.e., binary numbers), the present invention can be implemented with symbol alphabets containing more elements (e.g., having 64 levels encoding 6 bits into each symbol) as will be apparent to one skilled in the relevant arts by reading the disclosure herein. Such embodiments are contemplated to be within the scope and spirit of the present invention.

Figure 11:
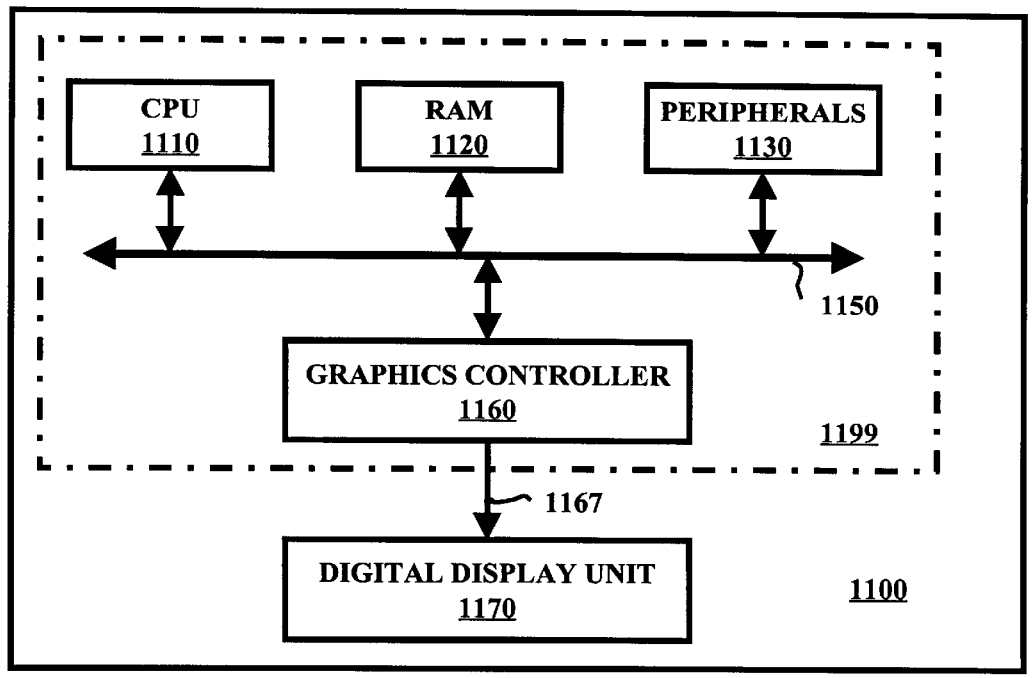
FIG. 11 is a block diagram of a computer system illustrating an example environment in which the present invention can be implemented.

FIG. 11 is a block diagram of computer system 1100 illustrating an example environment in which the present invention can be implemented. Computer system 1100 includes central processing unit (CPU) 1110, random access memory (RAM) 1120, one or more peripherals 1130, graphics controller 1160, and digital display unit 1170. CPU 1110, RAM 1120 and graphics controller 1160 are typically packaged in a single unit, and such a unit is referred to as source 1199 as the unit generates and transmits a sequence of symbols on a serial communication channel. All the components in graphics source 1199 of computer system 1100 communicate over bus 1150, which can in reality include several physical buses connected by appropriate interfaces.

RAM 1120 stores data representing commands and possibly pixel data elements representing a source image. CPU 1110 executes commands stored in RAM 1120, and causes different commands and pixel data elements to be transferred to graphics controller 1160. Peripherals 1130 can include storage components such as hard-drives or removable drives (e.g., floppy-drives). Peripherals 1130 can be used to store commands and/or data which enable computer system 1100 to operate in accordance with the present invention. By executing the stored commands, CPU 1110 provides the electrical and control signals to coordinate and control the operation of various components in graphics source 1199.

Graphics controller 1160 receives data/commands from CPU 1110, and generates pixel data elements representative of source images to be displayed on digital display unit. Graphics controller 1160 then encodes the data as symbols in a serial communication channel. The resulting signal ("display signal") may contain synchronization signals also in addition to the data. The display signal may be transferred according to standards such as Digital Flat Panel (DFP) and Digital Video Interface (DVI) well known in the relevant arts.

Digital display unit 1170 receives a display signal from graphics controller 1160, and displays the source images encoded in the display signal. Digital display unit 1170 recovers pixel data elements representing a source image in accordance with the present invention. The corresponding source images are then displayed. An example embodiment of digital display unit 1170 is described in further detail below.

15. Digital Display Unit

Figure 12:
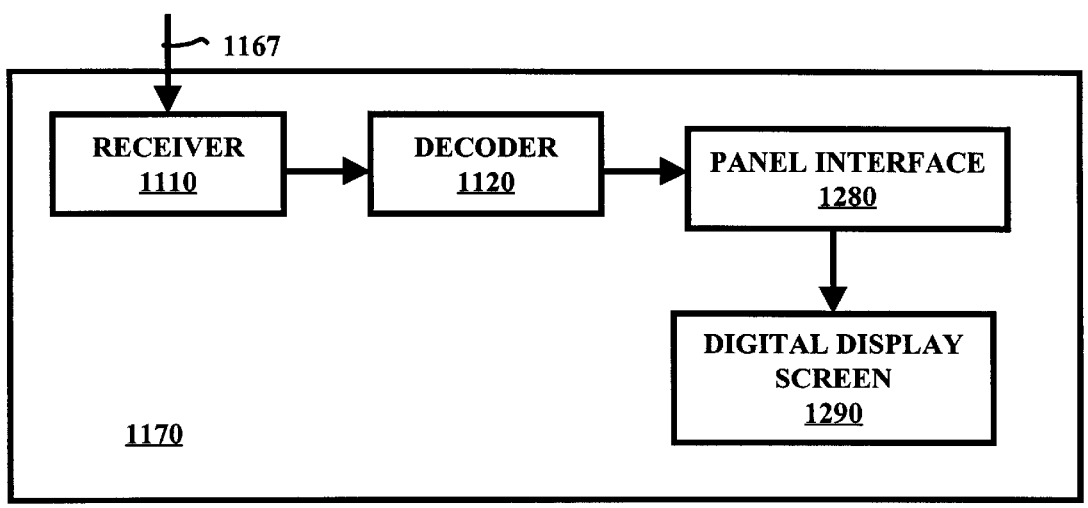
FIG. 12 is a block diagram of a digital display monitor in accordance with the present invention.

FIG. 12 is a block diagram of illustrating an embodiment of digital display unit 1170 in accordance with the present invention. Digital display unit 1170 may contain receiver 1210, decoder 1220, panel interface 1280 and digital display screen 1290. Each component is described below in further detail.

Digital display screen 1290 is characterized by discrete points commonly termed as pixels. Each pixel can generally be controlled individually, and all the pixels may be activated to various degrees to display an image on display screen 1290. In general, the image is determined by the data received on serial communication channel 1167.

Panel interface 1280 receives digital pixel data elements representing an image from decoder 1220, and generates electrical signals compatible with the implementation of display screen 1290 to display images represented by the pixel data elements. Panel interface 1280 may be implemented in a known way.

Receiver 1210 and decoder 1220 may be implemented akin to receiver 170 and decoder 190 described above. Receiver 1210 operates to recover the symbols encoded in serial communication channel 1167. Even though not shown, the clock signal contained in receiver 1210 may be provided to other components of digital display unit 1170.

Decoder 1220 recovers the pixel data elements represented by the recovered symbols, and forwards the pixel data elements to panel interface 1280, which causes the source images to be displayed on digital display screen 1290.

Thus, the present invention can be used in conjunction with computer systems, and specifically with display units. As the symbols are recovered accurately without substantial processing, the present invention is particularly suited for consumer markets where cost is of particular concern.

16. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

APPENDIX A

| 0: {EEE} | | X100100100XXX | [.PPPCCCNNNNNNN] |
|---|---|---|---|
| PE: X.100.100.100.X | T100, T100, T100 | ABC | |
| PN: 1.001.001.00X.X | T001, T001, T00X | AB. | |
| PL: 0.010.010.0XX.X | T010, T010, T0XX | A.. | |
| 1: {EEN} | | X100100010XXX | [.PPPCCCCNNNNNN] |
| PE: X.100.100.010.X | T100, T100, T010 | ABC | |
| PN: 1.001.000.10X.X | T001, T000, T10X | ABC | |
| PL: 0.010.001.0XX.X | T010, T001, T0XX | AB. | |
| 2: {EEL} | | X100100001XXX | [.PPPCCCCCNNNNN] |
| PE: X.100.100.001.X | T100, T100, T001 | ABC | |
| PN: 1.001.000.01X.X | T001, T000, T01X | ABC | |
| PL: 0.010.000.1XX.X | T010, T000, T1XX | ABC | |

APPENDIX A-continued

| | | | | |
|---|---|---|---|---|
| 3: {EER} | | X100100000XXX | [.PPPCCCCCCCCC] | |
| | PE: X.100.100.000.X | T100, T100, T000 | ABC | |
| | PN: 1.001.000.00X.X | T001, T000, T00X | ABC | |
| | PL: 0.010.000.0XX.X | T010, T000, T0XX | ABC | |
| 4: {ENE} | | X100010100XXX | [.PPPPCCNNNNNNN] | |
| | PE: X.100.010.100.X | T100, T010, T100 | .BC | |
| | PN: 1.000.101.00X.X | T000, T101, T00X | AB. | |
| | PL: 0.001.010.0XX.X | T001, T010, T0XX | A.. | |
| 5: {ENN} | | X100010010XXX | [.PPPPCCCNNNNNN] | |
| | PE: X.100.010.010.X | T100, T010, T010 | .BC | |
| | PN: 1.000.100.10X.X | T000, T100, T10X | ABC | |
| | PL: 0.001.001.0XX.X | T001, T001, T0XX | AB. | |
| 6: {ENL} | | X100010001XXX | [.PPPPCCCNNNNNN] | |
| | PE: X.100.010.001.X | T100, T010, T001 | .BC | |
| | PN: 1.000.100.01X.X | T000, T100, T01X | ABC | |
| | PL: 0.001.000.1XX.X | T001, T000, T1XX | ABC | |
| 7: {ENR} | | X100010000XXX | [.PPPPCCCCCCCC] | |
| | PE: X.100.010.000.X | T100, T010, T000 | .BC | |
| | PN: 1.000.100.00X.X | T000, T100, T00X | ABC | |
| | PL: 0.001.000.0XX.X | T001, T000, T0XX | ABC | |
| 8: {ELE} | | X100001100XXX | [.PPPPPCNNNNNNN] | |
| | PE: X.100.001.100.X | T100, T001, T100 | ..C | |
| | PN: 1.000.011.00X.X | T000, T011, T00X | .B. | |
| | PL: 0.000.110.0XX.X | T000, T110, T0XX | A.. | |
| 9: {ELN} | | X100001010XXX | [.PPPPPCCNNNNNN] | |
| | PE: X.100.001.010.X | T100, T001, T010 | ..C | |
| | PN: 1.000.010.10X.X | T000, T010, T10X | .BC | |
| | PL: 0.000.101.0XX.X | T000, T101, T0XX | AB. | |
| 10: {ELL} | | X100001001XXX | [.PPPPPCCNNNNN] | |
| | PE: X.100.001.001.X | T100, T001, T001 | ..C | |
| | PN: 1.000.010.01X.X | T000, T010, T01X | .BC | |
| | PL: 0.000.100.1XX.X | T000, T100, T1XX | ABC | |
| 11: {ELR} | | X100001000XXX | [.PPPPPCCCCCCC] | |
| | PE: X.100.001.000.X | T100, T001, T000 | ..C | |
| | PN: 1.000.010.00X.X | T000, T010, T00X | .BC | |
| | PL: 0.000.100.0XX.X | T000, T100, T0XX | ABC | |
| 12: {ERE} | | X100000100XXX | [.PPPPPPNNNNNNN] | |
| | PE: X.100.000.100.X | T100, T000, T100 | ABC | |
| | PN: 1.000.001.00X.X | T000, T001, T00X | AB. | |
| | PL: 0.000.010.0XX.X | T000, T010, T0XX | A.. | |
| 13: {ERN} | | X100000010XXX | [.PPPPPPPNNNNNN] | |
| | PE: X.100.000.010.X | T100, T000, T010 | ABC | |
| | PN: 1.000.000.10X.X | T000, T000, T10X | ABC | |
| | PL: 0.000.001.0XX.X | T000, T001, T0XX | AB. | |
| 14: {ERL} | | X100000001XXX | [.PPPPPPPPNNNNN] | |
| | PE: X.100.000.001.X | T100, T000, T001 | ABC | |
| | PN: 1.000.000.01X.X | T000, T000, T01X | ABC | |
| | PL: 0.000.000.1XX.X | T000, T000, T1XX | ABC | |
| 15: {ERR} | | X100000000XXX | [.PPPPPPPPPPPP] | |
| | PE: X.100.000.000.X | T100, T000, T000 | ABC | |
| | PN: 1.000.000.00X.X | T000, T000, T00X | ABC | |
| | PL: 0.000.000.0XX.X | T000, T000, T0XX | ABC | |
| 16: {NEE} | | X010100100XXX | [..PPCCCNNNNNNN] | |
| | : X.010.100.100.X | T010, T100, T100 | ABC | |
| | PN: 0.101.001.00X.X | T101, T001, T00X | AB. | |
| | PL: 1.010.010.0XX.X | T010, T010, T0XX | A.. | |
| 17: {NEN} | | X010100010XXX | [..PPCCCCNNNNNN] | |
| | PE: X.010.100.010.X | T010, T100, T010 | ABC | |
| | PN: 0.101.000.10X.X | T101, T000, T10X | ABC | |
| | PL: 1.010.001.0XX.X | T010, T001, T0XX | AB. | |
| 18: {NEL} | | X010100001XXX | [..PPCCCCCNNNNN] | |
| | PE: X.010.100.001.X | T010, T100, T001 | ABC | |
| | PN: 0.101.000.01X.X | T101, T000, T01X | ABC | |
| | : 1.010.000.1XX.X | T010, T000, T1XX | ABC | |
| 19: {NER} | | X010100000XXX | [..PPCCCCCCCCC] | |
| | PE: X.010.100.000.X | T010, T100, T000 | ABC | |
| | PN: 0.101.000.00X.X | T101, T000, T00X | ABC | |
| | PL: 1.010.000.0XX.X | T010, T000, T0XX | ABC | |
| 20: {NNE} | | X010010100XXX | [..PPPCCNNNNNNN] | |
| | PE: X.010.010.100.X | T010, T010, T100 | .BC | |

APPENDIX A-continued

|  |  |  |  |
|---|---|---|---|
| PN: 0.100.101.00X.X | T100, T101, T00X | AB. |  |
| PL: 1.001.010.0XX.X | T001, T010, T0XX | A.. |  |
| 21: {NNN} | X010010010XXX | [..PPPCCCNNNNNN] |  |
| PE: X.010.010.010.X | T010, T010, T010 | .BC |  |
| PN: 0.100.100.10X.X | T100, T100, T10X | ABC |  |
| PL: 1.001.001.0XX.X | T001, T001, T0XX | AB. |  |
| 22: {NNL} | X010010001XXX | [..PPPCCCCNNNNN] |  |
|  | T0XX |  |  |
| PE: X.010.010.001.X | T010, T010, T001 | .BC |  |
| PN: 0.100.100.01X.X | T100, T100, T01X | ABC |  |
| PL: 1.001.000.1XX.X | T001, T000, T1XX | ABC |  |
| 23: {NNR} | X010010000XXX | [..PPPCCCCCCCCC] |  |
| PE: X.010.010.000.X | T010, T010, T000 | .BC |  |
| PN: 0.100.100.00X.X | T100, T100, T00X | ABC |  |
| PL: 1.001.000.0XX.X | T001, T000, T0XX | ABC |  |
| 24: {NLE} | X010001100XXX | [..PPPPCNNNNNNN] |  |
| PE: X.010.001.100.X | T010, T001, T100 | ..C |  |
| PN: 0.100.011.00X.X | T100, T011, T00X | .B. |  |
| PL: 1.000.110.0XX.X | T000, T110, T0XX | A.. |  |
| 25: {NLN} | X010001010XXX | [..PPPPCCNNNNNN] |  |
| PE: X.010.001.010.X | T010, T001, T010 | ..C |  |
| PN: 0.100.010.10X.X | T100, T010, T10X | .BC |  |
| PL: 1.000.101.0XX.X | T000, T101, T0XX | AB. |  |
| 26 {NLL} | X010001001XXX | [..PPPPCCCNNNNN] |  |
| PE: X.010.001.001.X | T010, T001, T001 | ..C |  |
| PN: 0.100.010.01X.X | T100, T010, T01X | .BC |  |
| PL: 1.000.100.1XX.X | T000, T100, T1XX | ABC |  |
| 27 {NLR} | X010001000XXX | [..PPPPCCCCCCC] |  |
| PE: X.010.001.000.X | T010, T001, T000 | ..C |  |
| PN: 0.100.010.00X.X | T100, T010, T00x | .BC |  |
| PL: 1.000.100.0XX.X | T000, T100, T0XX | ABC |  |
| 28: {NRE} | X010000100XXX | [..PPPPPNNNNNNN] |  |
| PE: X.010.000.100.X | T010, T000, T100 | ABC |  |
| PN: 0.100.001.00X.X | T100, T001, T00X | AB. |  |
| PL: 1.000.010.0XX.X | T000, T010, T0XX | A.. |  |
| 29: {NRN} | X010000010XXX | [..PPPPPPNNNNNN] |  |
| PE: X.010.000.010.X | T010, T000, T010 | ABC |  |
| PN: 0.100.000.10X.X | T100, T000, T10X | ABC |  |
| PL: 1.000.001.0XX.X | T000, T001, T0XX | AB. |  |
| 30: {NRL} | X010000001XXX | [..PPPPPPPNNNNN] |  |
| PE: X.010.000.001.X | T010, T000, T001 | ABC |  |
| PN: 0.100.000.01X.X | T100, T000, T01X | ABC |  |
| PL: 1.000.000.1XX.X | T000, T000, T1XX | ABC |  |
| 31: {NRR} | X010000000XXX | [..PPPPPPPPPPPP] |  |
| PE: X.010.000.000.X | T010, T000, T000 | ABC |  |
| PN: 0.100.000.00X.X | T100, T000, T00X | ABC |  |
| PL: 1.000.000.0XX.X | T000, T000, T0XX | ABC |  |
| 32: {LEE} | X001100100XXX | [...PCCCNNNNNNN] |  |
| PE: X.001.100.100.X | T001, T100, T100 | ABC |  |
| PN: 0.011.001.00X.X | T011, T001, T00X | AB. |  |
| PL: 0.110.010.0XX.X | T110, T010, T0XX | A.. |  |
| 33: {LEN} | X001100010XXX | [...PCCCCNNNNNN] |  |
| PE: X.001.100.010.X | T001, T100, T010 | ABC |  |
| PN: 0.011.000.10X.X | T011 ,T000, T10X | ABC |  |
| PL: 0.110.001.0XX.X | T110, T001, 10XX | AB. |  |
| 34: {LEL} | X001100001XXX | [...PCCCCCNNNNN] |  |
| PE: X.001.100.001.X | T001, T100, T001 | ABC |  |
| PN: 0.011.000.01X.X | T011, T600, T01X | ABC |  |
| PL: 0.110.000.1XX.X | T110, T000, T1XX | ABC |  |
| 35: {LER} | X001100000XXX | [...PCCCCCCCCC] |  |
| PE: X.001.100.000.X | T001, T100, T000 | ABC |  |
| PN: 0.011.000.00X.X | T011, T000, T00X | ABC |  |
| PL: 0.110.000.0XX.X | T110, T000, T0XX | ABC |  |
| 36: {LNE} | X001010100XXX | [...PPCCNNNNNNN] |  |
| PE: X.001.010.100.X | T001, T010, T100 | .BC |  |
| PN: 0.010.101.00X.X | T010, T101, T00X | AB. |  |
| PL: 0.101.010.0XX.X | T101, T010, T0XX | A.. |  |
| 37: {LNN} | X001010010XXX | [...PPCCCNNNNNN] |  |
| PE: X.001.010.010.X | T001, T010, T010 | .BC |  |
| PN: 0.010.100.10X.X | T010, T100, T10X | ABC |  |

APPENDIX A-continued

|  |  |  |  |
|---|---|---|---|
| PL: 0.101.001.0XX.X | T101, T001, T0XX | AB. | |
| 38: {LNL} | X001010001XXX | [...PPCCCCNNNNN] | |
| PE: X.001.010.001.X | T001, T010, T001 | .BC | |
| PN: 0.010.100.01X.X | T010, T100, T01X | ABC | |
| PL: 0.101.000.1XX.X | T101, T000, T1XX | ABC | |
| 39: {LNR} | X001010000XXX | [...PPCCCCCCCC] | |
| PE: X.001.010.000.X | T001, T010, T000 | .BC | |
| PN: 0.010.100.00X.X | T010, T100, T00X | ABC | |
| PL: 0.101.000.0XX.X | T101, T000, T0XX | ABC | |
| 40: {LLE} | X001001100XXX | [...PPPCNNNNNN] | |
| PE: X.001.001.100.X | T001, T001, T100 | ..C | |
| PN: 0.010.011.00X.X | T010, T011, T00X | .B. | |
| PL: 0.100.110.0XX.X | T100, T110, T0XX | A.. | |
| 41: {LLN} | X001001010XXX | [...PPPCCNNNNN] | |
| PE: X.001.001.010.X | T001, T001, T010 | ..C | |
| PN: 0.010.010.10X.X | T010, T010, T10X | .BC | |
| PL: 0.100.101.0XX.X | T100, T101, T0XX | AB. | |
| 42: {LLL} | X001001001XXX | [...PPPCCCNNNN] | |
| PE: X.001.001.001.X | T001, T001, T001 | ..C | |
| PN: 0.010.010.01X.X | T010, T010, T01X | .BC | |
| PL: 0.100.100.1XX.X | T100, T100, T1XX | ABC | |
| 43: {LLR} | X001001000XXX | [...PPPCCCCCCC] | |
| : X.001.001.000.X | T001, T001, T000 | ..C | |
| PN: 0.010.010.00X.X | T010, T010, T01X | .BC | |
| PL: 0.100.100.0XX.X | T100, T100, T0XX | ABC | |
| 44: {LRE} | X001000100XXX | [...PPPPNNNNNN] | |
| PE: X.001.000.100.X | T001, T000, T100 | ABC | |
| PN: 0.010.001.00X.X | T010, T001, T00X | AB. | |
| PL: 0.100.010.0XX.X | T100, T010, T0XX | A.. | |
| 45: {LRN} | X001000010XXX | [...PPPPNNNNN] | |
| PE: X.001.000.010.X | T001, T000, T010 | ABC | |
| PN: 0.010.000.10X.X | T010, T000, T10X | ABC | |
| PL: 0.100.001.0XX.X | T100, T001, T0XX | AB. | |
| 46: {LRL} | X001000001XXX | [...PPPPPNNNNN] | |
| PE: X.001.000.001.X | T001, T000, T001 | ABC | |
| PN: 0.010.000.01X.X | T010, T000, T01X | ABC | |
| PL: 0.100.000.1XX.X | T100, T000, T1XX | ABC | |
| 47: {LRR} | X001000000XXX | [...PPPPPPPPPP] | |
| PE: X.001.000.000.X | T001, T000, T000 | ABC | |
| PN: 0.010.000.00X.X | T010, T000, T00X | ABC | |
| PL: 0.100.000.0XX.X | T100, T000, T0XX | ABC | |
| 48: {REE} | X000100100XXX | [....CCNNNNNNN] | |
| PE: X.000.100.100.X | T000, T100, T100 | ABC | |
| PN: 0.001.001.00X.X | T001, T001, T00X | AB. | |
| PL: 0.010.010.0XX.X | T010, T010, T0XX | A.. | |
| 49: {REN} | X000100010XXX | [....CCCCNNNNN] | |
| PE: X.000.100.010.X | T000, T100, T010 | ABC | |
| PN: 0.001.000.10X.X | T001, T000, T10X | ABC | |
| PL: 0.010.001.0XX.X | T010, T001, T0XX | AB. | |
| 50: {REL} | X000100001XXX | [....CCCCCNNNNN] | |
| PE: X.000.100.001.X | T000, T100, T001 | ABC | |
| PN: 0.001.000.01X.X | T001, T000, T01X | ABC | |
| PL: 0.010.000.1XX.X | T010, T000, T1XX | ABC | |
| 51: {RER} | X000100000XXX | [....CCCCCCCCC] | |
| PE: X.000.100.000.X | T000, T100, T000 | ABC | |
| PN: 0.00 .000.00X.X | T001, T000, T00X | ABC | |
| PL: 0.010.000.0XX.X | T010, T000, T0XX | ABC | |
| 52: {RNE} | X000010100XXX | [.....CCNNNNNNN] | |
| PE: X.000.010.100.X | T000, T010, T100 | ABC | |
| PN: 0.000.101.00X.X | T000, T101, T00X | AB. | |
| PL: 0.001.010.0XX.X | T001, T010, T0XX | A.. | |
| 53: {RNN} | X000010010XXX | [.....CCNNNNNN] | |
| PE: X.000.010.010.X | T000, T010, T010 | ABC | |
| PN: 0.000.100.10X.X | T000, T100, T10X | ABC | |
| PL: 0.001.001.0XX.X | T001, T001, T0XX | AB. | |
| 54: {RNL} | X000010001XXX | [......CCCCNNNNN] | |
| PE: X.000.010.001.X | T000, T010, T001 | ABC | |
| PN: 0.000.100.01X.X | T000, T100, T01X | ABC | |
| PL: 0.001.000.1XX.X | T001, T000, T1XX | ABC | |

APPENDIX A-continued

| | | | |
|---|---|---|---|
| 55: {RNR} | X000010000XXX | [.....CCCCCCCCC] | |
| PE: X.000.010.000.X | T000, T010, T000 | ABC | |
| PN: 0.000.100.00X.X | T000, T100, T00X | ABC | |
| PL: 0.001.000.0XX.X | T001, T000, T0XX | ABC | |
| 56: {RLE} | X000001100XXX | [......CNNNNNNN] | |
| PE: X.000.001.100.X | T000, T001, T100 | ABC | |
| PN: 0.000.011.00X.X | T000, T011, T00X | AB. | |
| PL: 0.000.110.0XX.X | T000, T110, T0XX | A.. | |
| 57: {RLN} | X000001010XXX | [......CCNNNNNN] | |
| PE: X.000.001.0 0.X | T000, T001, T010 | ABC | |
| PN: 0.000.010.10X.X | T000, T010, T10X | ABC | |
| PL: 0.000.101.0XX.X | T000, T101, T0XX | AB. | |
| 58: {RLL} | X000001001XXX | [......CCCNNNNN] | |
| PB: X.000.001.001.X | T000, T001, T001 | ABC | |
| PN: 0.000.010.01X.X | T000, T010, T01X | ABC | |
| PL: 0.000.100. XX.X | T000, T100, T1XX | ABC | |
| 59: {RLR} | X000001000XXX | [......CCCCCCCC] | |
| PE: X.000.001.000.X | T000, T001, T000 | ABC | |
| PN: 0.000.010.00X.X | T000, T010, T00X | ABC | |
| PL: 0.000.100.0XX.X | T000, T100, T0XX | ABC | |
| 60: {RRE} | X000000100XXX | [.......NNNNNNN] | |
| PE: X.000.000.100.X | T000, T000, T100 | ABC | |
| PN: 0.000.001.00X.X | T000, T001, T00X | AB. | |
| PL: 0.000.010.0XX.X | T000, T010, T0XX | A.. | |
| 61: {RRN} | X000000010XXX | [........NNNNNN] | |
| PE: X.000.000.010.X | T000, T000, T010 | ABC | |
| PN: 0.000.000.10X.X | T000, T000, T10X | ABC | |
| PL: 0.000.001.0XX.X | T000, T001, T0XX | AB. | |
| 62: {RRL} | X000000001XXX | [.........NNNNN] | |
| PE: X.000.000.001.X | T000, T000, T001 | ABC | |
| PN: 0.000.000.01X.X | T000, T000, T01X | ABC | |
| PL: 0.000.000. XX.X | T000, T000, T1XX | ABC | |
| 63: {RRR} | X000000000XXX | [.............] | |
| PE: X.000.000.000.X | T000, T000, T000 | ABC | |
| PN: 0.000.000.00X.X | T000, T000, T00X | ABC | |
| PL: 0.000.000.0XX.X | T000, T000, T0XX | ABC | |

TABLE I

Appendix B

| Current Token | Early Phase | Neutral Phase | Late Phase | Unconditional selection |
|---|---|---|---|---|
| T000 | ABC | ABC | ABC | ABC |
| T001 | C | AB | AB | none |
| T010 | BC | BC | A | none |
| T011 | none | B | none | B |
| T100 | ABC | ABC | ABC | ABC |
| T101 | none | AB | AB | AB |
| T110 | none | none | A | A |

TABLE II

Appendix C

| Number | Previous Token | Current Token | Early Phase State | Neutral Phase State | State Late Phase | State Phase ID |
|---|---|---|---|---|---|---|
| 1. | T000 | T101 | | X | X | Not E |
| 2. | T001 | T100 | X | | | E |
| 3. | T100 | T101 | | X | X | Not E |
| 4. | T101 | T000 | | X | X | Not E |
| 5. | T101 | T001 | | X | X | Not E |
| 6. | T000 | T011 | | X | | N |
| 7. | T001 | T010 | X | | X | Not N |
| 8. | T010 | T011 | | X | | N |
| 9. | T010 | T101 | | X | | N |
| 10. | T011 | T000 | | X | | N |
| 11. | T011 | T001 | | X | | N |
| 12. | T100 | T011 | | X | | N |
| 13. | T000 | T110 | | | X | L |
| 14. | T010 | T100 | X | X | | Not L |
| 15. | T100 | T110 | | | X | L |
| 16. | T101 | T010 | | | X | L |
| 17. | T110 | T000 | | | X | L |
| 18. | T110 | T001 | | | X | L |
| 19. | T110 | T010 | | | X | L |

What is claimed is:

1. A method of recovering a plurality of symbols transmitted over a serial communication channel in the form of a signal, said method comprising:

(a) receiving said signal;

(b) over sampling said signal to generate a plurality of samples corresponding to each of said plurality of symbols;

(c) generating a sampling clock signal, wherein said sampling clock signal controls said over sampling of (b);

(d) generating a plurality of transition indicators, wherein each transition indicator indicates the presence of a transition in value between two successive samples;

(e) determining a static phase status representing a long term phase shift of said signal relative to said sampling clock signal, wherein said long term phase shift of said signal is determined based on many prior samples corresponding to a plurality of prior symbols;

(f) examining a plurality of transition indicators corresponding to a few symbols including a current symbol to determine any short term phase shift of boundaries between symbols around said current symbol; and (g) selecting a sample corresponding to said current symbol according to said static phase status and said short term phase shift, wherein the selection based on said short term phase shift enables the sample corresponding to said current symbol to be selected accurately, and wherein the selection based on said static phase status enables th processing to be minimized in said selection.

2. The method of claim 1, wherein steps (e) and (g) are performed in parallel.

3. The method of claim 2, wherein said plurality of symbols are encoded with an alphabet containing two elements.

4. The method of claim 2, wherein step (d) comprises generating an XOR of two consecutive samples.

5. The method of claim 1, wherein (f) comprises:

(h) examining transitions corresponding to only said current symbol, and wherein said sample corresponding to said current symbol is selected according to the transitions corresponding to said current symbol and said static phase status.

6. The method of claim 5, and wherein said method further comprises:

(i) dividing said plurality of transition indicators into a plurality of tokens, with each token containing a number of transition indicators equal to said factor.

7. The method of claim 6, wherein each token is associated with a symbol, and wherein the token corresponding to said current symbol is determined by said sampling clock signal.

8. The method of claim 7, further comprising (j) examining the tokens corresponding to said few symbols to determine any shift in boundaries relative to said sampling clock signal, wherein the determination as to shift in boundaries is used in computing said static phase status.

9. The method of claim 8, wherein said static phase status indicates whether said signal is early, late or neutral relative to the determination of said sampling clock signal.

10. The method of claim 9, further comprising:

(k) generating hard identifiers when the examination of (j) indicates that said signal is early, late or neutral relative to said sampling clock signal; and (l) generating soft identifiers when the indication examination of (j) indicates that said signal is not early, not late or not neutral.

11. The method of claim 10, wherein said hard identifiers are given more weight than said soft identifiers in determining said static phase status.

12. The method of claim 1, wherein said signal is oversampled by a factor of 3.

13. The method of claim 1, wherein said method is implemented in a display unit to recover pixel data elements encoded in a display signal.

14. A circuit to recover a plurality of symbols encoded in a signal on a serial communication channel, said circuit comprising:

a clock generator to generate a sampling clock signal;

an analog to digital converter (ADC) to oversample said signal to generate a plurality of samples corresponding to each of said plurality of symbols, wherein said ADC over samples under the control of said sampling clock signal;

a transition detector to generate a plurality of transition indicators, wherein each transition indicator indicates the presence of a transition in value between two successive samples;

a static phase determination circuit to determine a static phase status representing a long term phase shift of said signal relative to said sampling clock signal, wherein said long term phase shift of said signal is determined based on many prior samples corresponding to a plurality of prior symbols; and a tokens analyzer to examine a plurality of transition indicators corresponding to a few symbols including a current symbol to determine any short term phase shift of boundaries between symbols around said current symbol, said token analyzer to determine which sample represents said current symbol according to said long term phase shift and said short term phase shift; and a samples selector to select said sample determined by said token analyzer as representing said current symbol, wherein the selection based on said term phase shift enables the sample representing said current symbol to be selected accurately, and wherein the selection based on said static phase status enables the processing to be minimized in said selection.

15. The circuit of claim 14, wherein said plurality of symbols are encoded with an alphabet containing two elements, and wherein said transition detector comprises a plurality of XOR gates to generate an XOR of two successive samples.

16. The circuit of claim 15, further comprises:

a token assembler for dividing said plurality of transition indicators into a plurality of tokens, with each token containing a number of transition indicators equal to a oversampling factor, wherein each token is associated with a symbol, and wherein the token corresponding to said current symbol is determined by said sampling clock signal.

17. The circuit of claim 16, wherein said tokens analyzer and said static phase determination circuit are designed to examine the tokens corresponding to said few symbols to determine any shift in boundaries relative to said sampling clock signal, wherein the determination as to shift in boundaries is used in computing said static phase status.

18. The circuit of claim 17, wherein said static phase determination circuit indicates whether said signal is early, late or neutral relative to the determination of said sampling clock signal.

19. The circuit of claim 18, wherein said static phase determination circuit is designed to generate hard identifiers if the examination of tokens corresponding to said few symbols indicates that said signal is early, late or neutral relative to said sampling clock signal, and to generate soft identifiers if the examination of tokens corresponding to said few symbols indicates that said signal is not early, not late or not neutral.

20. The circuit of claim 19, wherein said hard identifiers are given more weight than said soft identifiers in determining said static phase status.

21. The circuit of claim 14, wherein said signal is oversampled by a factor of 3.

22. The circuit of claim 21, wherein said tokens analyzer is designed to examine transition indicators corresponding to only said current symbol, and wherein said sample corresponding to said current symbol is selected according to the transitions corresponding to said current symbol and said static phase status.

23. The circuit of claim 14, wherein said static phase determination circuit and said samples selector are designed to operate in parallel.

24. A circuit to recover a plurality of symbols encoded in a signal on a serial communication channel, said circuit comprising:

receiving means for receiving said signal;

over sampling means for over sampling said signal to generate a plurality of samples corresponding to each of said plurality of symbols;

first generating means for generating a sampling clock signal, wherein said sampling clock signal controls said over sampling means;

second generating means for generating a plurality of transition indicators, wherein each transition indicator indicates the presence of a transition in value between two successive samples;

determination means for determining a static phase status representing a long term phase shift of said signal relative to said sampling clock signal, wherein said long term phase shift of said signal is determined based on many prior samples corresponding to a plurality of prior symbols;

examination means for examining a plurality of transition indicators corresponding to a few symbols including a current symbol to determine any short term phase shift of boundaries between symbols around said current symbol; and selection means for selecting a sample from the samples corresponding to said current symbol according to said status and said short term phase shift, wherein the selection based on said term phase shift enables the sample corresponding to said current symbol to be selected accurately, and wherein the selection based on said phase status enables the processing to be minimized in said selection.

25. The circuit of claim 24, wherein said plurality of symbols are encoded with an alphabet containing two elements, and wherein said transition detector comprises a plurality of XOR gates to generate an XOR of two successive samples.

26. The circuit of claim 25, further comprises:

a token assembler means for dividing said plurality of transition indicators into a plurality of tokens, with each token containing a number of transition indicators equal to a oversampling factor, wherein each token is associated with a symbol, and wherein the token corresponding to said current symbol is determined by said sampling clock signal.

27. The circuit of claim 26, wherein said examination means and said determination means are designed to examine the tokens corresponding to said few symbols to determine any shift in boundaries relative to said sampling clock signal, wherein the determination as to shift in boundaries is used in computing said static phase status.

28. The circuit of claim 27, wherein said determination means indicates whether said signal is early, late or neutral relative to the determination of said sampling clock signal.

29. The circuit of claim 28, wherein said determination means is designed to generate hard identifiers if the examination of tokens corresponding to said few symbols indicates that said signal is early, late or neutral relative to said sampling clock signal, and to generate soft identifiers if the examination of tokens corresponding to said few symbols indicates that said signal is not early, not late or not neutral.

30. The circuit of claim 29, wherein said hard identifiers are given more weight than said soft identifiers in determining said static phase status.

31. The circuit of claim 24, wherein said signal is oversampled by a factor of 3.

32. The circuit of claim 24, wherein said examination means is designed to examine transition indicators corresponding to only said current symbol, and wherein said sample corresponding to said symbol is selected according to the transitions corresponding to said symbol and said phase status.

33. The circuit of claim 24, wherein said determination means and said selection means are designed to operate in parallel.

* * * * *